United States Patent
Tsubouchi

[19]

[11] Patent Number: 6,135,007
[45] Date of Patent: Oct. 24, 2000

[54] VACUUM SERVO APPARATUS

[75] Inventor: Kaoru Tsubouchi, Toyota, Japan

[73] Assignee: Aisin Seiki Kabushiki Kaisha, Kariya, Japan

[21] Appl. No.: 09/342,172

[22] Filed: Jun. 29, 1999

[30] Foreign Application Priority Data

| Jun. 29, 1998 | [JP] | Japan | 10-182835 |
| Sep. 14, 1998 | [JP] | Japan | 10-260303 |

[51] Int. Cl.[7] ............................ F15B 9/10; F15B 13/16
[52] U.S. Cl. ............................................. 91/369.2; 91/367
[58] Field of Search ........................ 91/369.1, 369.2, 91/369.3, 367, 376 R

[56] References Cited

U.S. PATENT DOCUMENTS

| 3,548,595 | 12/1970 | Pech et al. | 91/369.3 |
| 4,719,842 | 1/1988 | Gautier | 91/369.2 |
| 5,483,866 | 1/1996 | Schlüter . | |
| 5,943,937 | 8/1999 | Endo | 91/369.2 |

FOREIGN PATENT DOCUMENTS

| 299628 | 4/1992 | Germany | 91/369.2 |
| 4-189665 | 7/1992 | Japan . | |
| 257760 | 9/1992 | Japan | 91/369.2 |

*Primary Examiner*—F. Daniel Lopez
*Attorney, Agent, or Firm*—Burns, Doane, Swecker & Mathis, LLP

[57] ABSTRACT

A vacuum servo apparatus capable of reducing variations in the input and output characteristics includes a housing, movable walls, a power piston, an input member, an input rod, a valve mechanism, an output rod and a reaction disk. The length of the input member in the front and rear direction is increased or decreased in accordance with a change in the air temperature.

17 Claims, 10 Drawing Sheets

VACUUM SERVO APPARATUS

This application corresponds to and claims priority under 35 U.S.C. §119 with respect to Japanese Application No. 10(1998)-182835 filed on Jun. 29, 1998 and Japanese Application No. 10(1998)-260303 filed on Sep. 14, 1998, the entire content of both of which is incorporated herein by reference.

FIELD OF THE INVENTION

The present invention generally relates to a braking force assisting or boosting device. More particularly, the present invention pertains to a vacuum servo apparatus for an automobile.

BACKGROUND OF THE INVENTION

A conventional vacuum servo apparatus generally includes:

a housing formed with at least a pressure space at an inner portion thereof, a movable wall installed in the housing such that the movable wall is capable of progressing and regressing relative to the housing and dividing the pressure space into a front chamber communicating with a negative pressure source and a rear chamber selectively communicating with the front chamber and the atmosphere, a power piston coupled to the movable wall, an input member arranged at an inner portion of the power piston progressably and regressably relative to the power piston and movable by operating an operating member, a valve mechanism having a negative pressure valve communicating the rear chamber with the front chamber in accordance with movement of the input member and an atmospheric valve communicating the rear chamber to the atmosphere in accordance with the movement of the input member, an output member for outputting a progressive force of the power piston to outside of the device by being made to progress by progress of the power piston in accordance with movement of the movable wall, and a reaction force member for transmitting the progressive force of the power piston and an input applied on the input member to the output member and exerting a reaction force having a magnitude in correspondence with an output from the output member to make the input member regress by being elastically deformed to bulge in a rear direction, and in which an elastic deformation amount of the reaction force member is increased or decreased in accordance with at least a change in a temperature of the reaction force member and the atmospheric valve is closed by making the input member regress by receiving the reaction force from the reaction force member.

According to the conventional vacuum servo apparatus, when the input member is made to progress by operating the operating member by the input of a driver, the negative pressure valve of the valve mechanism is closed, communication between the front chamber and the rear chamber is cut, the atmospheric valve of the valve mechanism is opened and the rear chamber is made to communicate with the atmosphere. By communicating the rear chamber with the atmosphere, pressure difference is produced between the front chamber and the rear chamber, the progressive force is produced in the movable wall and the power piston and the output member outputs the progressive force of the power piston to outside of the device. When the output member outputs the progressive force of the power piston, the reaction force member exerts the reaction force having the magnitude in correspondence with the output from the output member to the input member to thereby make the input member regress and the input member is made to regress by which the atmospheric valve is closed and communication between the rear chamber and the atmosphere is cut. That is, according to the valve mechanism, there is constituted a balanced state in which the atmospheric valve and the negative pressure valve are brought into a closed state and the vacuum servo apparatus generates the output in correspondence with the input to the operating member.

However, according to the conventional vacuum servo apparatus, easiness of elastic deformation of the reaction force member is changed in accordance with a change in the temperature of the reaction force member and the elastic deformation amount is increased or decreased and therefore, there is a concern that an input and output characteristic of the vacuum servo apparatus is varied in accordance with the temperature change of the reaction force member.

U.S. Pat. No. 5,483,866 discloses a vacuum servo apparatus that includes a housing forming at least one pressure space, a movable wall installed in the housing for dividing the pressure space into a front chamber communicated with a negative pressure source and a rear chamber selectively communicated with the front chamber and the atmosphere, a power piston coupled to the movable wall, an input member arranged at the inner portion of the power piston for moving relative to the power piston, a valve plunger member arranged in the power piston for moving integrally with the input member, and a control valve having an atmospheric valve seat arranged at the valve plunger member, a negative pressure valve seat arranged in the power piston, an atmospheric seal portion attachable and detachable to and from the atmospheric valve seat for cutting off communication between the rear chamber and the atmosphere by being brought into contact with the atmospheric valve seat and communicating the rear chamber with the atmosphere by being separated from the atmospheric valve seat, and a negative pressure seal portion attachable and detachable to and from the negative pressure valve seat for cutting off communication between the front chamber and the rear chamber by being brought into contact with the negative pressure valve seat and communicating the rear chamber with the front chamber by being separated from the negative pressure valve seat. The apparatus also includes an output member for outputting a progressive force of the power piston in accordance with movement of the movable wall, a reaction force member for transmitting the progressive force of the power piston and an input applied to the input member to the output member and providing a reaction force having a magnitude corresponding to the output from the output member to make the input member regress, and an actuator for making the rear chamber and the atmosphere communicatable to each other by separating the atmospheric valve seat from the atmospheric seal portion by forwardly moving the valve plunger member.

The conventional vacuum servo apparatus separates the atmospheric valve seat from the atmospheric seal portion by moving the valve plunger member through operation of the actuator separately from operation of the input member and produces a pressure difference between the front chamber and the rear chamber by communicating the rear chamber with the atmosphere. When the pressure difference is produced between the front chamber and the rear chamber by operating the actuator, progressive forces are produced at the movable wall and the power piston and the output member outputs the progressive force of the power piston to outside of the device.

When the vehicle is brought into the oversteered state in turning the vehicle, in the brake hydraulic pressure device of the vehicle having the brake steering control (oversteering restraining control) for supplying the brake fluid to the outer side front wheel of turning by operating the pump without braking operation of the driver and temporarily increasing the brake hydraulic pressure of the outer side front wheel of turning to thereby escape from the oversteered state, the prestage pressurizing function is requested for supplying the pressurized brake fluid to the pump such that the pump can supply the brake fluid smoothly to the outer side front wheel of turning.

When the prestage pressurizing function is carried out by the above-described vacuum servo apparatus, for example, in the case in which the vehicle is brought into the oversteered state in turning the vehicle, the actuator is driven with no braking operation of the driver and the rear chamber is communicated with the atmosphere by driving the actuator. A significant pressure difference is produced between the front chamber and the rear chamber to thereby produce an output. Successively, it is conceivable that the output from the vacuum servo apparatus is converted into hydraulic pressure by a well-known master cylinder and the pressurized brake fluid is supplied to the pump and the pump sucks the pressurized brake fluid and supplies the brake fluid to the outer side front wheel of turning.

However, according to the constitution of the hydraulic pipes of the brake device having the brake steering control, it is conceived that wheels other than the outer side front wheel of turning are constituted to communicate with the master cylinder. That is, according to the known vacuum servo apparatus, by driving the actuator, the atmosphere is completely delivered into the rear chamber and accordingly, strong output is produced and in the brake steering control, when the conventional vacuum servo apparatus is operated as the prestage pressurizing function, strong hydraulic pressure is directly provided from the master cylinder to wheels other than the wheel constituting the object of the brake steering control and there is a concern that the function of the brake steering control cannot be achieved sufficiently.

A need thus exists for a vacuum servo apparatus capable of reducing the variation in the input and output characteristics

SUMMARY OF THE INVENTION

In light of the above, one aspect of the invention involves a negative pressure type servo unit that includes a housing in which is formed at least one pressure space, a movable wall installed in the housing for progressive and regressive movement relative to the housing and dividing the pressure space into a front chamber adapted to be communicated with a negative pressure source and a rear chamber adapted to be selectively communicated with the front chamber and atmosphere, a power piston coupled to the movable wall, an input member arranged at an inner portion of the power piston for progressive and regressive movement relative to the power piston and movable through operation of an operating member, a valve mechanism having a negative pressure valve for communicating the rear chamber to the front chamber according to movement of the input member and an atmospheric valve for communicating the rear chamber with the atmosphere according to movement of the input member, and an output member for outputting a progressive force of the power piston to outside by progressing as a result of progress of the power piston in accordance with movement of the movable wall. A reaction force member transmits the progressive force of the power piston and an input applied to the input member to the output member and exerts a reaction force having a magnitude corresponding to an output from the output member to cause the input member to regress through elastic deformation of the reaction force member. The amount of elastic deformation of the reaction force member is increased or decreased in accordance with at least a change in temperature of the reaction force member, with the input member regressing by receiving the reaction force from the reaction force member to thereby close the atmospheric valve. The input member has a length in the front and rear direction that is adapted to be increased or decreased in relation to an increase or a decrease of the amount of elastic deformation associated with at least the change in temperature of the reaction force member.

The atmospheric valve preferably includes an atmospheric valve seat arranged at the input member and movable with the input member relative to the power piston and an atmospheric seal portion engageable with and disengageable from the atmospheric valve seat for cutting off communication between the rear chamber and the atmosphere by being brought into engagement with the atmospheric valve seat and communicating the rear chamber to the atmosphere by being disengaged from the atmospheric valve seat. The input member includes a contact portion capable of being brought into contact with the reaction force member at a front portion thereof and the length of the input member in the front and rear direction is the distance between the contact portion and the atmospheric valve seat.

The input member may include a first input member capable of being brought into contact with the reaction force member and a second input member having the atmospheric valve seat and arranged on the rear side of the first input member, with the second member being progressively and regressively movable relative to the first input member, and at least one of the first input member and the second input member includes a portion engaging with other thereof having an elasticity and an elastic deformation amount of the engaging portion is increased or decreased in accordance with a change in temperature of the engaging portion. An increase or a decrease in the length of rearward bulging of the reaction force member in accordance with the elastic deformation of the reaction force member associated with the change in the temperature of the reaction force member and an increase or a decrease in a length of the engaging portion in the front and rear direction in accordance with the elastic deformation of the engaging portion associated with the change in the temperature of the engaging portion are substantially equal to each other.

According to another aspect of the invention, a vacuum servo apparatus includes a housing in which is formed at least one pressure space, a movable wall installed in the housing for progressive and regressive movement relative to the housing and dividing the pressure space into a front chamber adapted to be communicated with a negative pressure source and a rear chamber adapted to be selectively communicated with the front chamber and atmosphere, a power piston coupled to the movable wall, an input member arranged at an inner portion of the power piston for progressive and regressive movement relative to the power piston and movable through operation of an operating member, a valve mechanism having a negative pressure valve for communicating the rear chamber to the front chamber in accordance with movement of the input member and an atmospheric valve for communicating the rear chamber with the atmosphere in accordance with the movement of the input member, and an output member for outputting a progressive force of the power piston to outside of the device by being made to progress by progress of the power piston in accordance with movement of the movable wall. A reaction force member transmits the progressive force of the power piston and an input applied to the input member to the output member and is capable of exerting a reaction force having a magnitude in correspondence with an output from the output member to make the input member regress by being elastically deformed to bulge rearwardly. An actuator is capable of making the output member progress independently from the progressive force produced in the power piston by operating the valve mechanism by the movement of the input member in accordance with operating the operating member. The amount of elastic deformation of the reaction force member is increased or decreased in accordance with a change in at least temperature of the reaction force member and wherein the atmospheric valve is made closable by making the input member regress by receiving the reaction force from the reaction force member in driving the actuator and a length of the input member in a front and rear direction can be increased or decreased in relation to an increase or a decreased of the elastic deformation amount of the reaction force member in accordance with at least the change in the temperature of the reaction force member.

According to a further aspect of the invention, a vacuum servo apparatus includes a housing in which is formed at least one pressure space, a movable wall installed in the housing for progressive and regressive movement relative to the housing to divide the pressure space into a front chamber communicated with a negative pressure source and a rear chamber selectively communicated with the front chamber and the atmosphere, a power piston coupled to the movable wall, an input member arranged at an inner portion of the power piston for progressive and regressive movement relative to the power piston and movable by operating an operating member, a negative pressure valve for communicating the rear chamber with the front chamber in accordance with movement of the input member, and an atmospheric valve including an atmospheric valve seat arranged at the input member for integral movement with the input member relative to the power piston and an atmospheric seal portion engageable with and disengageable from the atmospheric valve seat for cutting off communication between the rear chamber and the atmosphere by bringing the atmospheric seal portion into engagement with the atmospheric valve seat in accordance with the movement of the input member and communicating the rear chamber with the atmosphere by disengaging the atmospheric seal portion from the atmospheric valve seat. An output member outputs a progressive force of the power piston to outside of the device by being made to progress by progress of the power piston in accordance with movement of the movable wall, and a reaction force member which transmits the progressive force of the power piston and an input applied to the input member to the output member and which exerts a reaction force having a magnitude in correspondence with an output from the output member to make the input member regress by being elastically deformed to bulge rearwardly by receiving at least the progressive force of the power piston. The amount of rearward bulging of the reaction force member when a temperature of the reaction force member is a first temperature and the output outputted from the output member is provided with a first output value being less than the amount of rearward bulging of the reaction force member when the temperature of the reaction force member is a second temperature lower than the first temperature and the output outputted from the output member is provided with the first output value. A correcting device makes at least the atmospheric valve seat and the atmospheric seal portion proximate to each other by supplementing at least a portion of the difference between the amount of rearward bulging the reaction force member when the temperature of the reaction force member is the first temperature and the output outputted from the output member is provided with the first output value and the amount of rearwardly bulging the reaction force member when the temperature of the reaction force member is the second temperature lower than the first temperature and the output outputted from the output member is provided with the first output value.

Another aspect of the invention involves a vacuum servo apparatus that includes a housing in which is formed at least one pressure space, a movable wall installed in the housing for progressive and regressive movement relative to the housing and dividing the pressure space into a front chamber adapted to communicate with a negative pressure source and a rear chamber adapted to selectively communicate with the front chamber and the atmosphere, a power piston coupled to the movable wall, an input member arranged at an inner portion of the power piston for progressive and regressive movement relative to the power piston and movable by operating an operating member, a negative pressure valve for communicating the rear chamber with the front chamber in accordance with movement of the input member, and an atmospheric valve including an atmospheric valve seat arranged at the input member and integrally movably with the input member relative to the power piston and an atmospheric seal portion engageable with and disengageable from the atmospheric valve seat for cutting off communication between the rear chamber and the atmosphere by bringing the atmospheric seal portion into engagement with the atmospheric valve seat in accordance with movement of the input member and communicating the rear chamber with the atmosphere by disengaging the atmospheric seal portion from the atmospheric valve seat. An output member outputs a progressive force of the power piston to outside of the apparatus by being caused to progress by progress of the power piston in accordance with movement of the movable wall. A reaction force member transmits the progressive force of the power piston and an input applied to the input member to the output member and is adapted to exert a reaction force having a magnitude in correspondence with an output from the output member to make the input member regress by being elastically deformed to bulge rearwardly by receiving at least the progressive force of the power piston. An actuator is adapted to progressively move the output member independently from the progressive force produced at the power piston by operating the valve mechanism through movement of the input member in accordance with operating the operating member. The amount of rearward bulging of the reaction force member when a temperature of the reaction force member is a first temperature and the output outputted from the output member is provided with a first output value being less than an amount of rearward bulging of the reaction force member when the temperature of the reaction force member is a second temperature lower than the first temperature and the output outputted from the output member is provided with the first output value. The atmospheric valve is adapted to be closed by making the input member regress upon receiving the reaction force from the reaction force member during operation of the actuator and a correcting device makes at least the atmospheric valve seat and the atmospheric seal portion proximate to each other by supplementing at least a portion of a difference between the amount of rearward bulging of the reaction force member when the temperature of the reaction force member is the first temperature and the output outputted from the output member is provided with the first output value and the amount of rearwardly bulging the reaction force member when the temperature of the reaction force member is the second temperature lower than the first temperature and the output outputted from the output member is provided with the first output value.

By virtue of the present invention, the length of the input member in the front and rear direction is increased or decreased in relation to the increase or the decrease of the amount of elastic deformation of the input member associated with at least the change of the temperature of the reaction force member. The length of the input member in the front and rear direction is increased or decreased by elastically deforming the engaging portion. In addition, the distance from the contact portion of the input member to the atmospheric valve seat is increased or decreased in relation to the increase or the decrease in the amount of elastic deformation of the reaction force member associated with the change in the temperature of the reaction force member.

According to the fifth aspect of the vacuum servo apparatus, in addition to the operation of the third aspect or the fourth aspect, the elastic deformation amount of the engaging portion is restricted to the predetermined amount by the restricting member.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
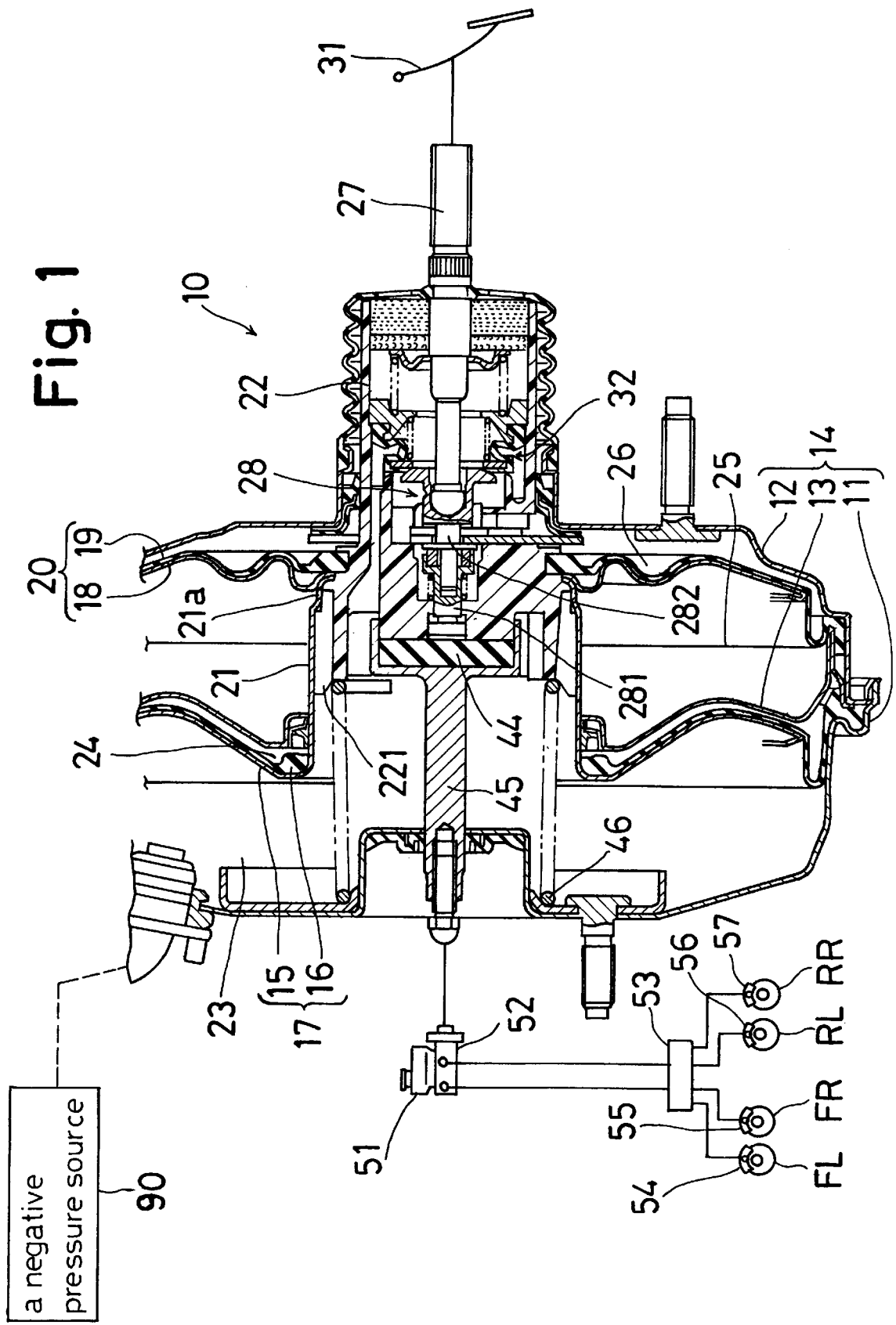
FIG. 1 is a cross-sectional view of a vacuum servo apparatus according to a first embodiment of the present invention.

Referring initially to FIG. 1, the vehicular vacuum servo apparatus 10 according to a first embodiment of the present invention includes a housing 14 constituted by a front shell 11, a rear shell 12 and a partition wall member 13 between the two shells. A front pressure chamber and a rear pressure chamber are formed inside the housing 14. A front movable wall 17 is located in the front pressure chamber in the housing 14 and includes a front plate 15 made of a metal and a front diaphragm 16 made of rubber. A rear movable wall 20 is disposed in the rear pressure chamber and includes a rear plate 18 made of a metal and a rear diaphragm 19 made of rubber.

The central portion of the front plate 15 is integrally provided with a cylindrical portion 21 penetrating the central portion of the partition wall member 13 in an airtight and slidable manner. A bead portion at an inner peripheral edge of the front diaphragm 16 is fixed in an airtight manner to the outer peripheral face of the front end portion of the cylindrical portion 21 of the front plate 15, and a bead portion at the outer peripheral edge of the front diaphragm 16 is sandwiched in an airtight manner by outer peripheral portions of the shells 11, 12 along with the outer peripheral edge portion of the partition wall member 13.

The bead portion at the outer peripheral edge of the rear diaphragm 19 is sandwiched in an airtight manner by a folded portion provided on the inner diameter side of the outer peripheral edge of the partition wall member 13 and the rear shell 12. A power piston 22 penetrates the central portion of the rear shell 12 in an airtight and slidable manner. The rear end of the cylindrical portion 21 of the front plate 15 and the inner peripheral edge portion of the rear plate 18 are fixed at the outer periphery of the front side portion of the power piston 22 and a bead portion of the inner peripheral edge of the rear diaphragm 19 is also fixed to the outer periphery of the power piston 22 in an airtight manner.

The front pressure chamber in the housing 14 is thus divided into a first front chamber 23 and a first rear chamber 24, and the rear pressure chamber in the housing 14 is divided into a second front chamber 25 and a second rear chamber 26. The first front chamber 23 is communicated with an engine intake manifold constituting a negative pressure source 90 and is normally maintained at negative pressure. The second front chamber 25 is communicated with the first front chamber 23 by a hole 21a formed in the cylindrical portion 21 of the front plate 15 and a groove 221 formed at the outer periphery of the front end portion of the power piston 22. Accordingly, the second front chamber 25 is also normally maintained at negative pressure.

The first rear chamber 24 is communicated with the second rear chamber 26 by a groove 16a formed at the inner peripheral face of a bead portion at the outer peripheral edge of the front diaphragm 16, a hole 13a formed in the partition wall member 13 and a groove 19a formed at the outer peripheral face of the bead portion at the outer peripheral edge of the rear diaphragm 19.

Figure 2:
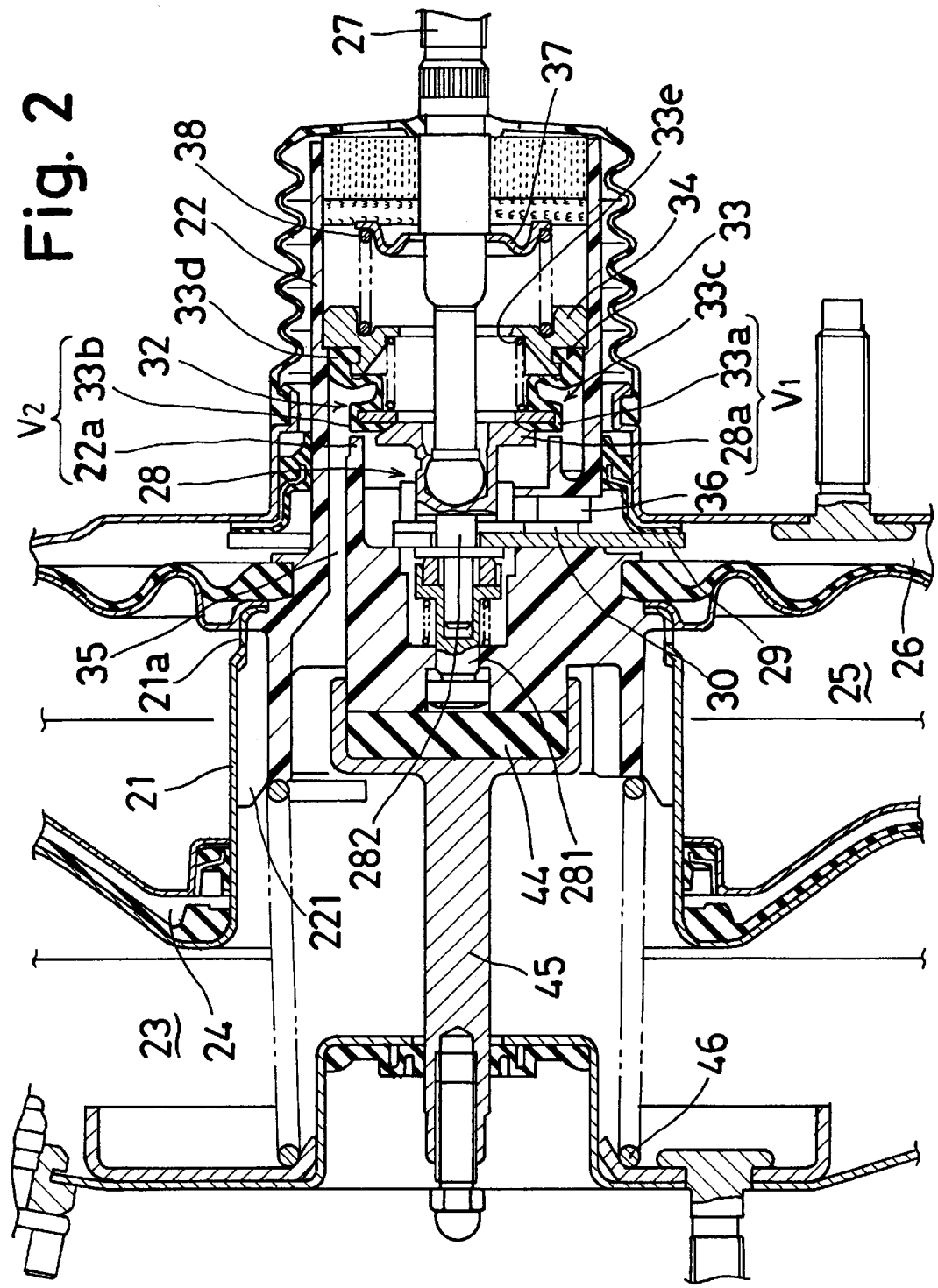
FIG. 2 is an enlarged cross-sectional of a portion of the valve mechanism used in the vacuum servo apparatus shown in FIG. 1.
Figure 3:
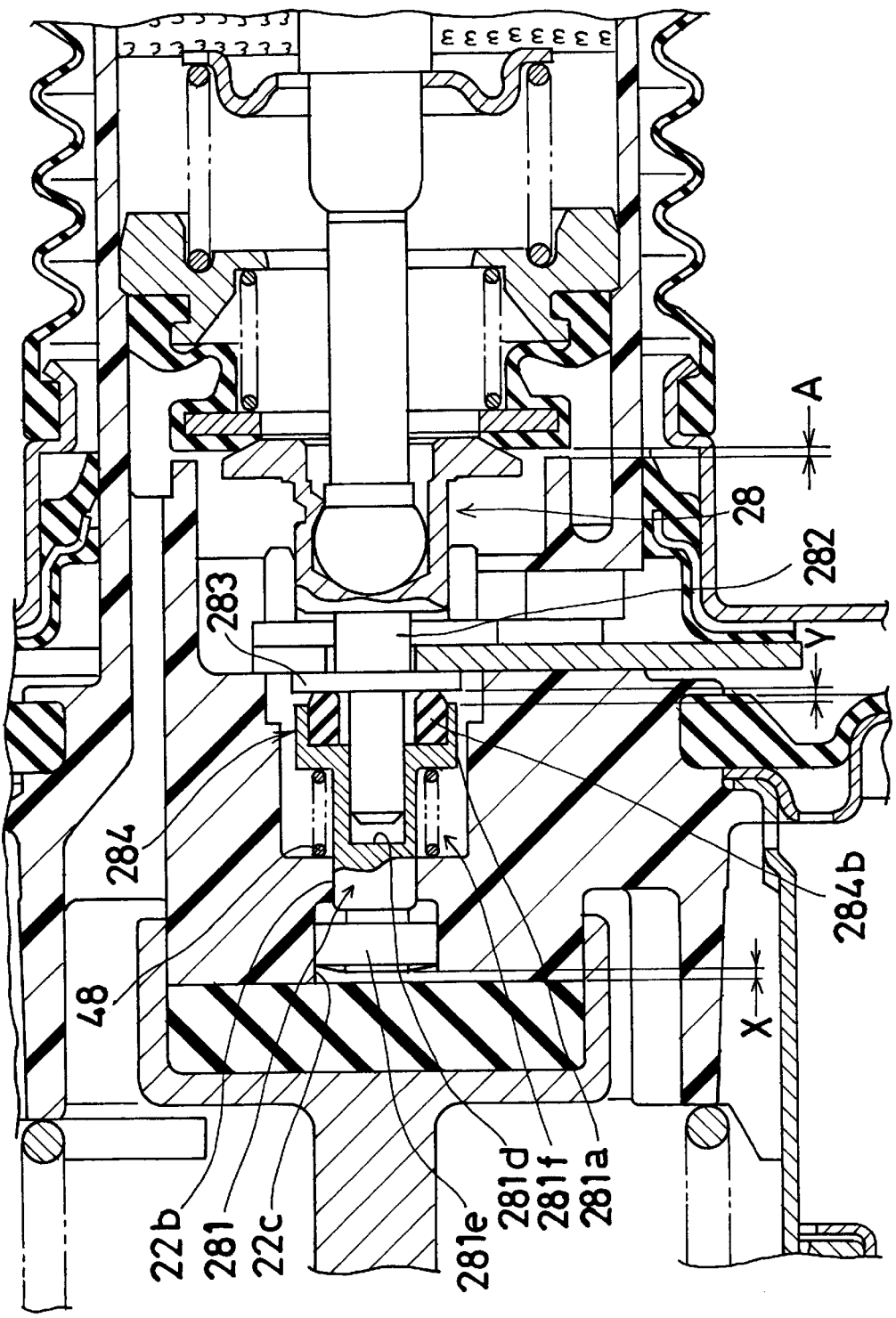
FIG. 3 is an enlarged cross-sectional view of a portion of the input member shown in FIG. 2.

As shown in FIGS. 1–3, an input rod 27 is positioned within the inner portion of the power piston 22 for forward and rearward movement relative to the power piston 22. The input rod 27 is connected to an input member 28 that is slidably guided in the front and rear directions (i.e., left and right direction in FIG. 2) by the power piston 22. The input rod 27 is connected to the input member 28 by a ball joint at the front end and is connected to a brake pedal 31 at its rear end.

The input member 28 is provided with a first input member 281 which is arranged at the front side (i.e., left side in FIG. 2) in the power piston 22 and a front face which is adapted to be brought into contact with the rear face of a reaction disk 44. The input member 28 also includes a second input member 282 arranged at the rear side (i.e., right side in FIG. 2) of the first input member 281 coaxially with the first input member 281 and to which the input rod 27 is connected.

The first input member 281 is provided at its rear portion with a recess portion 281d opening in the rearward direction. A front end portion of the second input member 282 is slidably positioned within the recess portion 281d of the first input member 281 for sliding movement in the front and rear directions. Accordingly, the first input member 281 is movable in the front and rear directions relative to the second input member 282. In an initial state shown in FIG. 3, a predetermined amount of clearance is arranged between the bottom face of the recess portion 281d of the first input member 281 and the front end face of the second input member 282.

The power piston 22 is provided with a key member 29 for defining a forward limit position and a rearward limit position of the input member 28 relative to the power piston 22. The key member 29 is located in a radially extending hole 30 formed in the power piston 22 and is locked to the power piston 22 such that the key member 29 does not come off the power piston 22.

Positioned within the power piston 22 is a valve mechanism 32 for switching between an output reducing operation state in which the second rear chamber 26 is communicated with the first front chamber 23 and is cut off from the atmosphere, an output maintaining operation state in which the second rear chambers 26 is cut off from the first front chamber 23 and the atmosphere, and an output increasing operation state in which the second rear chamber 26 is cut off from the first front chamber 23 and is communicated with the atmosphere, in accordance with the position of the input member 28 in the front and rear directions relative to the power piston 22.

The valve mechanism 32 is constituted by an atmospheric valve seat 28a having a substantially ring-like shape formed integrally with the input member 28 and directed in the rear direction (i.e., the right direction in FIG. 2), a negative pressure valve seat 22a having a substantially ring-like shape formed integrally with the power piston 22 and directed in the rear direction, and a control valve 33. The control valve 33 is integrally provided with an atmospheric seal portion 33a having a substantially ring-like shape opposed to the atmospheric valve seat 28a for engaging and disengaging the atmospheric valve seat 28a, and a negative pressure seal portion 33b having a substantially ring-like shape opposed to the negative valve seat 22a for engaging and disengaging the negative valve seat 22a.

The control valve 33 includes a movable portion 33c integrally provided with the atmospheric seal portion 33a and the negative pressure seal portion 33b, a fixed portion 33d fixed in an airtight manner to the power piston 22 by a retainer 34, and a valve spring 33e urging the movable portion 33c in the front direction.

In the valve mechanism 32, the atmospheric seal portion 33a and the atmospheric valve seat 28a constitute an atmospheric valve V1, and the negative seal portion 33b and the negative pressure valve seat 22a constitute a negative pressure valve V2.

The power piston 22 is formed with a vacuum path 35 for communicating the negative pressure valve V2 of the valve mechanism 32 with the first front chamber 23 and an air path 36 for communicating the atmospheric valve of the valve mechanism 32 with the second rear chamber 26. In the power piston 22, a space portion on the inner peripheral side of the fixed portion 33d of the control valve 33 is communicated with the atmosphere via a rear opening of the power piston 22.

According to the valve mechanism 32, the second rear chamber 26 is cut off from the atmosphere by bringing the atmospheric valve seat 28a of the atmospheric valve V1 into contact with the atmospheric seal portion 33a and the second rear chamber 26 is communicated with the atmosphere by separating the atmospheric valve seat 28a from the atmospheric seal portion 33a. Also, communication between the first front chamber 23 and the second rear chamber 26 is cut off by bringing the negative pressure valve seat 22a of the negative pressure valve V2 into contact with the negative pressure seal portion 33b, and the first front chamber 23 and the second rear chamber 26 are communicated with each other by separating the negative pressure valve seat 22a from the negative pressure seal portion 33b.

A spring 38 arranged between a retainer 37 locked to the input rod 27 and the retainer 34 urges the input rod 27 and accordingly the input member 28 in the rear direction. When the brake pedal 31 is not depressed, that is in an initial state shown by FIGS. 1–3, there is maintained a state in which the atmospheric valve seat 28a is brought into contact with the atmospheric seal portion 33a and the negative pressure seal portion 33b is separated from the negative pressure valve seat 22a. In the initial state, a clearance in an amount represented by the distance A in FIG. 3 is present between the negative pressure valve seat 22a and the negative pressure seal portion 33b.

The rear portion of the first input member 281 is provided with an engaging portion 284 which is brought into contact with an outwardly-directed flange portion 283 of the second input member 282. The engaging portion 284 is provided with a bottomed cylindrical portion 284a that opens in the rear direction (i.e., the right direction in FIG. 3) and an annular or ring-shaped rubber member 284b which is arranged in the hole of the bottomed cylindrical portion 284a. The front end portion of the rubber member 284b is brought into contact with a bottom face of the bottomed cylindrical portion 284a and the rear end portion of the rubber member 284b projects from the opening of the bottomed cylindrical portion 284a in the rearward direction.

The length of the rubber member 284b in the front and the rear direction is greater than the depth of the hole in the cylindrical portion 284a. In the initial state, a clearance of a predetermined amount Y is provided between the peripheral edge portion of the opening which forms a rear end portion of the bottomed cylindrical portion 284a of the first input member 281 and the front face portion of the radially outwardly-directed flange portion 283 of the second input member 282.

The rubber member 284b is elastically deformable in the front and rear direction upon being compressed in accordance with movement of the second input member 282 relative to the first input member 281. The elastic deformation property of the rubber member 284b, that is the ease with which elastic deformation occurs, is changed in accordance with air temperature and accordingly the temperature of the rubber member 284b. Compared with the easiness of deformation at a normal temperature (first temperature) of the rubber member 284b, for example 20° C. through 25° C., the deformation of the rubber member 284b becomes more difficult at lower temperatures (second temperature) of the rubber member 284b, for example −25° C. through −30° C.

In other words, when the same operational force is exerted on the rubber member 284b under normal temperature and under low temperature, comparing the amount of elastic deformation of the rubber member 284b at the normal temperature of the rubber member 284b and the amount of elastic deformation at the low temperature, the amount of elastic deformation of the rubber member 284b at the lower temperature is smaller.

A spring 48 is arranged between the peripheral edge portion of an opening on the rear side of an assembling hole 22b formed at a front portion of the power piston 22 into which the first input member 281 is slidably inserted in the axial direction and the engaging portion 284 of the first input member 281. The spring 48 urges the first input member 281 in the rear direction to thereby bring the rear face of the rubber member 284b of the first input member 281 into contact with the front face of the outwardly-directed flange portion 283 of the second input member 282 in the initial state. Accordingly, the first input member 281 is capable of progressing and regressing (i.e., forward and rearward movement) integrally with the second input member 282 relative to the power piston 22.

The reaction disk 44 in the form of a circular disk-shaped rubber element is installed in a recess portion that is formed at the front end face of the power piston 22 and that opens in the front direction. The front side of the reaction disk 44 faces the rear end portion of an output rod 45 that penetrates in an airtight and slidable manner through the central portion of the front shell 11 of the housing 14.

As is well known, the reaction disk 44 transmits a progressive force of the power piston 22 and a progressive force of the input member 28 to the output rod 45, and exerts a reaction force having a magnitude corresponding to the output from the output rod 45 to thereby cause the input member 28 to regress or move rearward. Further, the reaction disk 44 possesses a property similar to that of the rubber member 284b of the first input member 281, with the property of elastic deformation being changed in accordance with air temperature and accordingly, the temperature of the reaction disk 44.

When the temperature of the reaction disk 44 is at a normal temperature (first temperature), for example, 20° C. through 25° C., the reaction disk deforms relatively easily and when temperature of the reaction disk 44 is at a lower temperature (second temperature), for example −25° C. through −30° C., it is relatively difficult to deform the elastic disk 44. In other words, when the same operational force is exerted against the reaction disk 44 under a normal temperature and under a low temperature, comparing the amount of elastic deformation at the normal temperature of the reaction disk 44 and the amount of elastic deformation at the low temperature, the amount of elastic deformation at the low temperature becomes smaller.

As seen in FIG. 3, in the initial state, a clearance of a predetermined amount X is present between the rear face of the reaction disk 44 and the front end face of the input member 28, that is the front end face of the first input member 281.

A return spring 46 is installed at a central portion of the first front chamber 23 for urging the power piston 22 and the two movable walls 17, 20 coupled to the power piston 22 to regress or move rearward relative to the housing 14.

The output rod 45 is operationally connected to a piston of a master cylinder 51. The master cylinder 51 is provided with a reservoir tank 52, and the master cylinder 51 is connected with an actuator portion 53 for control of ABS (antilock brake system), TRC (traction control) and brake steering control via hydraulic pipes. The actuator portion 53 is connected with wheel cylinders 54, 55, 56, 57 arranged at respective wheels FR, FL, RR, RL via hydraulic pipes.

Having described the features associated with the vacuum servo apparatus of the present invention, the manner of operation will now be described. In the state shown in FIGS. 1–3, the brake pedal 31 is not depressed and the valve mechanism 32 is positioned in the output reducing operation state in which the second rear chamber 26 is communicated with the first front chambers 23 and is cut off from the atmosphere. That is, there is brought about a state in which the atmospheric valve seat 28a is brought into contact with the atmospheric seal portion 33a and the negative pressure valve seat 22a is separated from the negative pressure seal portion 33b, with the pressure in the first rear chamber 22 and the second rear chamber 26 being lowered to a pressure that is the same as the pressure in the first front chamber 23.

Accordingly, no progressive force is operated on the two movable walls 17, 20 and so the power piston 22 and the two movable walls 17, 20 coupled to the power piston 22 are maintained at the regress limit position relative to the housing 14 by the return spring 46.

Under the initial state shown in FIGS. 1–3, the relationship between the clearances A and X is A<X.

Figure 4:
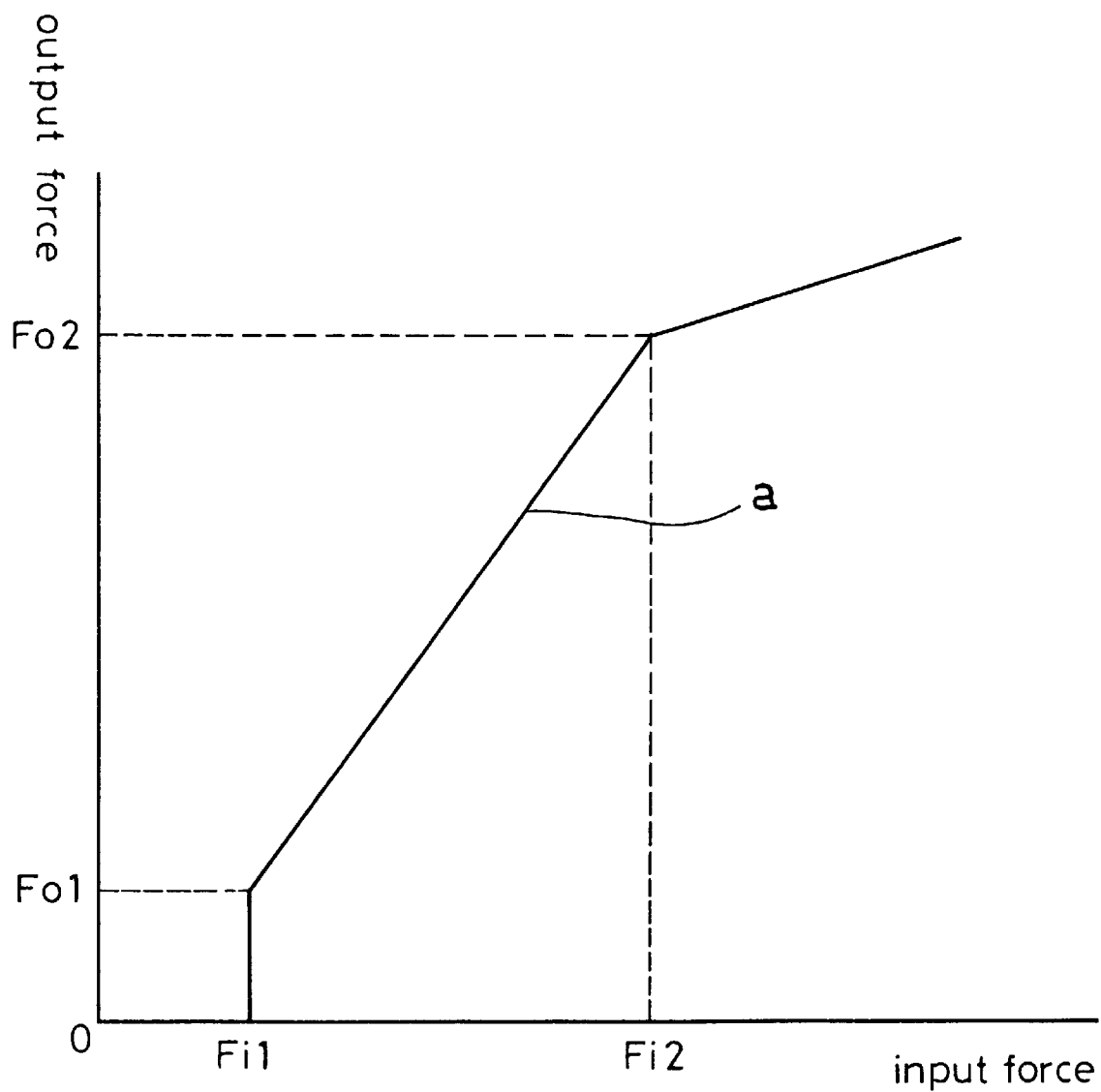
FIG. 4 is a diagram showing the input and output characteristics of the vacuum servo apparatus of FIG. 1.

FIG. 4 is a diagram illustrating the characteristic line of the vacuum servo apparatus according to this embodiment in which the ordinate represents the output and the abscissa represents the input. In the case in which temperature of the air, and accordingly the temperature of the reaction disk 44 and the rubber member 284b, is at a normal temperature (for example 20° C. through 25° C.), when a driver depresses the brake pedal 31 for normal braking operation by an input Fi1, the input rod 27 progresses relative to the power piston 22.

By virtue of the progress or movement of the input rod 27, the second input member 282 of the input member 28 progresses or moves integrally with the input rod 27. As a result of the progress or movement of the second input member 282, the rear end portion of the rubber member 284b of the engaging portion 284 of the first input member 281 is pressed by the outwardly-directed flange portion 283 of the second input member 282. Accordingly, in accordance with the progress or movement of the second input member 282, the first input member 281 also moves or progresses integrally with the second input member 282 and the input rod 27. That is, the input member 28 integrally progresses or moves.

In accordance with the movement of the input member 28, the movable portion 33c of the control valve 33 is urged forwardly by the valve spring 33e and progresses or moves integrally with the input member 28. The negative pressure seal portion 33b of the control valve 33 is thus brought into contact with the negative pressure valve seat 22a of the power piston 22 and the negative pressure valve V2 is closed. At this time, the clearance between the rear face of the reaction disk 44 and the front end portion of the input member 28, that is the front end face of the first input member 281, becomes a distance (X−A).

By closing the negative pressure valve V2, communication between the vacuum path 35 and the air path 36 is cut off and the second rear chamber 26 is cut off from the first front chamber 23. That is, the valve mechanism 32 is switched from the output reducing operation state to the output maintaining operation state.

When the input rod 27 and the input member 28 move or progress from the state in which the valve mechanism 32 is brought into the output maintaining operation state by a further distance of $\alpha\{<(X-A)\}$, the atmospheric valve seat 28a of the input member 28 is separated from the atmospheric seal portion 33a of the control valve 33 by the distance $\alpha$ and the atmospheric valve V1 is opened. At this time, a clearance of a distance $(X-A-\alpha)$ is present between the front end portion of the first input member 281 and the rear face of the reaction disk 44.

By opening the atmospheric valve V1, the air path 36 communicates with the atmosphere via the clearance between the atmospheric valve seat 28a and the atmospheric seal portion 33a. The second rear chamber 26 thus communicates with the atmosphere and the valve mechanism 32 is switched to the output increasing operation state. By switching the valve mechanism 32 to the output increasing operation state, atmospheric air flows into the second rear chamber 26 and flows further from the second chamber 26 to the first rear chamber 24. The pressure in the two rear chambers 24, 26 is thus increased, a progressive force is produced at the first movable wall 17 by the pressure difference between the first front chamber 23 and the first rear chamber 24, a progressive force is produced at the second movable wall 20 by the pressure difference between the second front chamber 25 and the second rear chamber 26, and a progressive force is produced at the power piston 22 by the pressure difference between the first front chamber 23 and the second rear chamber 26.

These progressive forces are transmitted from the power piston 22 to the output rod 45 via the reaction disk 44, and the two movable walls 17, 20, the power piston 22 and the output rod 45 integrally start progressing relative to the housing 14 and operation of the master cylinder 51 is started.

At this time, the power piston 22 also progresses or moves relative to the input member 28 and the atmospheric seal portion 33a of the control valve 33 approaches the atmospheric valve seat 28a. Further, the reaction disk 44 is compressed to deform by the power piston 22 and the output rod 45, and the reaction disk 44 bulges rearwardly into a center hole 22c incorporating the front portion 281e of the first input member 281 at the front portion of the power piston 22.

By making the power piston 22 progress relative to the input member 28, finally, the atmospheric seal portion 33a of the control valve 33 is again brought into contact with the atmospheric valve seat 28a so that communication between the air path 36 and the atmosphere is cut off and atmosphere air stops flowing into the two rear chambers 24, 26. The valve mechanism 32 is thus switched to the output maintaining operation state.

When the atmospheric valve V1 is closed, the reaction disk 44 first bulges rearwardly by a distance of $\alpha$ which is an amount of progress of the power piston 22 relative to the input member 28 consumed for bringing the atmospheric seal portion 33a in contact with the atmospheric valve seat 28a and successively, the reaction disk 44 bulges rearwardly to fill the clearance of the distance $(X-A-\alpha)$ between the reaction disk 44 and the first input member 281 which remains when the valve mechanism 32 is brought into the output increasing operation state and the bulged portion is brought into contact with the front end face of the first input member 281 of the input member 28.

At a point in time when the bulged portion of the reaction disk 44 is brought into contact with the front end face of the first input member 281, there remains the clearance of distance Y between the peripheral edge portion of the rear opening of the bottomed cylindrical portion 284a of the first input member 281 and the front face of the outwardly-directed flange portion 283 of the second input member 282. Under normal temperature, the rubber member 284b is easily elastically deformable and accordingly, by elastically deforming the rubber member 284b, the first input member 281 is brought into a state in which the first input member 281 can regress relative to the second input member 282 by the distance Y.

Accordingly, by bulging the reaction disk 44 further rearwardly from a state in which the reaction disk 44 is brought into contact with the front end portion of the first input member 281, the rubber member 284b is elastically deformed in the front and rear direction and the first input member 281 is made to regress relative to the second input member 282 and the power piston 22. The regressing movement of the first input member 281 relative to the second input member 282 is finished when the peripheral edge portion of the rear opening of the bottomed cylindrical portion 284a of the engaging portion 284 contacts the outwardly-directed flange portion 283.

That is, the amount of rearward bulging the reaction disk 44 is substantially equal to the sum of the distance a which is the amount of progress of the power piston 22 relative to the input member 28 consumed for bringing the atmospheric seal portion 33a into contact with the atmospheric valve seat 28a, the clearance $(X-A-\alpha)$ and the clearance of the distance Y between the first input member of the power piston and the second input member 282 of the power piston. That is, the bulging amount is substantially equal to a distance $(X+Y-A)$.

The amount of regressing movement of the input member 28 relative to the power piston in shifting the valve mechanism 32 from the output increasing operation state to the output maintaining operation state is substantially equal to the separation amount $\alpha$ between the atmospheric valve seat 28a and the atmospheric seal portion 32a.

Further, in shifting the valve mechanism 32 from the output increasing operation state to the output maintaining operation state, by the rearward bulging of the reaction disk 44, the reaction disk 44 is brought into contact with the front end portion of the input member 28 and at the input member 28, the peripheral edge portion of the opening of the bottomed cylindrical portion 284a of the first input member 281 is brought into contact with the outwardly-directed flange portion 283 of the second input member 282. Therefore, in this state, there is brought about a state in which the input member 28 is regressable or rearwardly movable relative to the power piston 22 by the rearward bulging of the reaction disk 44. However, the reaction disk 44 does not yet exert reaction force in correspondence with the output from the output rod 45 to the input member 28.

At this time, the input exerted from the brake pedal 31 to the input member 28 by a driver is provided with the value Fi1 shown in FIG. 4 and the output exerted from the output rod 45 to the master cylinder 51 is provided with a value Fo1 shown in FIG. 4.

That is, there is carried out a "jumping" in which the input member 28 does not receive the reaction force from the reaction disk 44 with the constant input value of Fi1 and the output is shifted from the output value 0 to the output value Fo1. The output Fo1 in accordance with this "jumping" (jumping output) is dependent on the amount of bulging of the reaction disk 44 which is substantially equal to the distance $(X+Y-A)$.

In this case in which the output Fo1 is produced and the valve mechanism 32 is brought into the output maintaining operation state, when the input exerted from the brake pedal 31 to the input member 28 by the driver is increased to, for example, a value less than Fi2 in FIG. 4, because the peripheral edge portion of the rear opening of the bottomed cylindrical portion 284a of the first input member 281 is brought into contact with the outwardly directed flange portion 283 of the second input member 282, the first input member 281 and the second input member 282 integrally progress relative to the power piston 22. That is, the input member 28 progresses relative to the power piston 22, the atmospheric valve seat 28a is again separated, from the atmospheric seal portion 33a of the control valve 33, and the atmospheric valve V1 is opened (i.e., the valve mechanism 32 is switched to the output increasing operation state).

Accordingly, atmospheric air flows into the two rear chambers 24, 26, the pressure in the rear chambers 24, 26 increases, the progressive forces of the movable walls 17, 20 and the power piston 22 are increased, and the two movable walls 17, 20, the power piston 22 and the output rod 45 further progress relative to the housing 14.

Further, when the power piston 22 progresses relative to the input member 28 and in accordance with the progress of the power piston 22, the reaction disk 44 exerts a reaction force to the input member 28 to thereby move integrally the first input member 281 and the second input member 282, that is the input member 28, rearwardly so that the atmospheric seal portion 33a of the control valve 33 approaches the atmospheric valve seat 28a, and finally the atmospheric valve seat 28a is again brought into contact with the atmospheric seal portion 33a of the control valve 33 and the atmospheric valve V1 is closed. That is, the flow of atmospheric air into the two rear chambers 24, 26 is stopped (the valve mechanism 32 is switched to the output maintaining operation state) and the progressive forces of the two movable walls 17, 20 and the power piston 22 stops increasing. In this case, the output produced by the vacuum servo apparatus 10 becomes the output along the operational line a shown in FIG. 4.

In the state in which the valve mechanism 32 is brought into the output maintaining operation state, for example when the input exerted from the brake pedal 31 to the input member 28 is reduced to a value larger than Fi1 shown in FIG. 4, the input rod 27 and the second input member 282 integrally regress or move rearward relative to the power piston 22. Further, the first input member 281 urged rearwardly by the spring 48 also regresses. That is, the first input member 281 and the second input member 282 integrally regress or move rearward.

The input member 28 regresses relative to the power piston 22 in accordance with the regressing movement of the input member 28, the movable portion 33c of the control valve 33 regresses relative to the power piston 22, the negative pressure seal portion 33b is separated from the negative pressure valve seat 22a, and the negative pressure valve seat V2 is opened (i.e., the valve mechanism 32 is switched to the output reducing operation state).

By separating the negative pressure valve seat 22a from the negative pressure seat portion 33b, the vacuum path 35 communicates with the air path 36 via the clearance between the negative pressure valve seat 22a and the negative pressure seal portion 33b, the two rear chambers 24, 26 are brought into communication with the first front chamber 23, the atmospheric air in the two rear chambers 24, 26 is exhausted by the negative pressure source via the first front chamber 23, and the pressure in the two rear chambers 24, 26 is reduced.

Accordingly, the progressive forces of the two movable walls 17, 20 and the power piston 22 are reduced and the movable walls 17, 20, the power piston 22 and the output rod 45 regress or move rearward relative to the housing 14. At this time, the power piston 22 regresses also relative to the input member 28, the negative pressure valve seat 22a approaches the negative pressure seal portion 33b of the control valve 33, and finally the negative pressure valve seat 22a is brought into contact with the negative pressure seal portion 33b and the negative pressure valve V2 is closed. Accordingly, the flow of atmospheric air from the two rear chambers 24, 26 to the first front chamber 23 is stopped (i.e., the valve mechanism 32 is switched to the output maintaining operation state) and a reduction in the progressive forces of the two movable walls 17, 20 and the power piston 22 is stopped.

At this time, the output produced by the vacuum servo apparatus 10 becomes the output along the operational line a in FIG. 4. That is, in normal operation under normal temperature, in the range of the input of Fi1 through Fi2, the input and output characteristics of the vacuum servo apparatus 10 follow the operational line a.

The input value Fi2 shown in FIG. 4 indicates an input value by which the pressure of the two rear chambers 24, 26 reaches atmospheric pressure in normal operation (under normal temperature). In the range of the input of the value Fi1 through the value Fi2, the amount of change of the output exerted from the output rod 45 to the master cylinder 51 is larger than the amount of change of the input exerted on the input member 28. The ratio of the input to the output, that is the inclination of the operational line a, coincides with the ratio of the area of the rear face of the reaction disk 44 brought in contact with the front end-face of the input member 28 to the area of the rear face of the reaction disk 44.

In FIG. 4, the output in the case of the input having the value Fi2 is the value Fi2. When the input is further increased from the value Fi2, the output is increased by an amount equal to the increase of the input. In FIG. 4, the amount of change of force per unit length of the ordinate is larger than the amount of change of force per unit length of the abscissa. When the graph in FIG. 4 is drawn by making the amount of change of force per unit length of the ordinate equal to the amount of change of force per unit length of the abscissa, the line indicating the correlation between the input and the output in the case in which the input is larger than the value Fi2, possesses a slope of 45 degrees.

Generally, in the "jumping" operation of the vacuum servo apparatus, when the amount of bulging of the reaction disk is small, the output in "jumping" is reduced and when the bulging amount is large, the output in "jumping" is increased.

Further, the jumping output is also dependent on the characteristic of the elastic deformation of the reaction disk. That is, the ease with which the elastic deformation of the reaction disk occurs is changed by changes in the air temperature and accordingly the temperature of the reaction disk. For example, when the air temperature and accordingly the temperature of the reaction disk is changed from a normal temperature (for example, 20° C. through 25 ° C.) to a low temperature (for example, −25° C. through −30° C.), the reaction disk is hardened and so the reaction disk becomes more difficult to elastically deform (i.e., the reaction disk does not deform as easily). Therefore, when the same operational force is exerted on the reaction disk under the aforementioned normal temperature and under the aforementioned low temperature, the amount of rearwardly bulging of the reaction disk in the case of the low temperature becomes smaller than the amount of rearward bulging in the normal temperature.

Accordingly, in the jumping operation of the vacuum servo apparatus, the propulsion force of the power piston or the output from the output rod which is required for producing the bulging amount of the reaction disk necessary for shifting the valve mechanism from the output increasing operation state to the output maintaining operation state when the reaction disk is under low temperature is increased more than that under the normal temperature. That is, under low temperature, with the same input, the output becomes larger than that under normal temperature.

In the case of the vacuum servo apparatus 10 according to this embodiment where the air temperature and accordingly the temperature of the reaction disk 44 and the rubber member 284*b* is low (for example, −25° C. through −30° C.), when the driver depresses the brake pedal 31 with input of Fi1 for a normal braking operation, the input rod 27 progresses or moves forward relative to the power piston 22.

By virtue of the movement or progress of the input rod 27, the second input member 282 of the input member 28 progresses integrally with the input rod 27, and by virtue of the progress of the second input member 282 the rear end portion of the rubber member 284*b* of the engaging portion 284 of the first input member 281 is pressed by the outwardly-directed flange portion 283 of the second input member 282. According to the progress of the second input member 282, the first input member 281 also progresses integrally with the second input member 282 and the input rod 27. That is, the input member 28 integrally progresses.

In accordance with the movement of the input member 28, the movable portion 33*c* of the control valve 33 is urged forwardly by the valve spring 33*e* and progresses integrally with the input member 28, the negative pressure seal portion 33*b* of the control valve 33 is brought into contact with the negative pressure valve seat 22*a* of the power piston 22, and the negative pressure valve V2 is closed. At this time, the clearance between the rear face of the reaction disk 44 and the front end portion of the input member 28, that is the front end face of the first input member 281, becomes the distance (X−A).

By closing the negative pressure valve V2, communication between the vacuum path 35 and the air path 36 is cut off and the second rear chamber 26 is cut off from the first front chamber 23. That is, the valve mechanism 32 is switched from the output reducing operation state to the output maintaining operation state.

When the input rod 27 and the input member 28 further progress from the state in which the valve mechanism 32 is brought into the output maintaining operation state by the distance α{<(X−A)}, the atmospheric valve seat 28*a* of the input member 28 is separated from the atmospheric seal portion 33*a* of the control valve 33 by the distance α and the atmospheric valve VI is opened. At this time, the clearance represented by the distance (X−A−α) is present between the front end portion of the first input member 281 and the rear face of the reaction disk 44.

By communicating the air path 36 with the atmosphere via the clearance between the atmospheric valve seat 28*a* and the atmospheric seal portion 33*a* by opening the atmospheric valve VI, the second rear chamber 26 is communicated with the atmosphere and the valve mechanism 32 is switched to the output increasing operation state.

By switching the valve mechanism 32 to the output increasing operation state, atmospheric air flows into the second rear chamber 26 and further flows from the second rear chamber 26 to the first rear chamber 24. The pressure in the two rear chambers 24, 26 is thus increased, a progressive force is produced at the first movable wall 17 by the pressure difference between the first front chamber 23 the first rear chamber 24, a progressive force is produced at the second movable wall 20 by the pressure difference between the second front chamber 25 and the second rear chamber 26, and a progressive force is produced at the power piston 22 by the pressure difference between the first front chamber 23 and the second rear chamber 26.

These progressive forces are transmitted from the piston 22 to the output rod 45 via the reaction disk 44, and the two movable walls 17, 20, the power piston 22 and the output rod 45 integrally start progressing relative to the housing 14 and operation of the master cylinder 51 is started.

At that time, the power piston 22 also progresses relative to the input member 28 and the atmospheric seal portion 33*a* of the control valve 33 approaches the atmospheric valve seat 28*a*. Further, the reaction disk 44 is compressed to be rearwardly deformed by the power piston 22 and the output rod 45, and accordingly the reaction disk 44 bulges into the center hole 22*c* incorporating the front portion 281*e* of the first input member 281 at the front portion of the power piston 22.

By virtue of the progress of the power piston 22 relative to the input member 28, the atmospheric seal portion 33*a* of the control valve 33 is again brought into contact with the atmospheric valve seat 28*a*, communication between the air path 36 and the atmosphere is cut off, and the flow of atmospheric air into the two rear chambers 24, 26 is stopped (i.e., the valve mechanism 32 is switched to the output maintaining operation state).

When the atmospheric valve V1 is closed, under normal temperature, the reaction disk 44 bulges rearwardly by the distance (X+Y−A). However, under low temperature, the reaction disk 44 is relatively hard and becomes difficult to elastically deform and so the amount of rearward bulging of the reaction disk 44 is reduced.

Meanwhile, the rubber member 284*b* of the engaging portion 284 of the first input member 281 is hardened in a manner similar to the reaction disk 44 and accordingly, the rubber member 284*b* is not easily elastically deformed. That is, although under normal temperature, by elastically deforming the rubber member 284*b*, the first input member 281 is moved rearwardly relative to the second input member 282, under low temperature substantially no elastic deformation is caused in the rubber member 284*b* and so the first input member 281 is not moved rearwardly relative to the second input member 282.

Accordingly, by rearwardly bulging the reaction disk 44 to thereby contact the front end portion of the member 281, there is brought about a state in which the first input member 281 and the second input member 282, that is the input member 28, can be made to regress relative to the power piston 22 with no relative movement between the first input member 281 and the second input member 282.

Accordingly, in the jumping operation of the vacuum servo apparatus 1 under low temperature, the amount necessary for bulging the reaction disk 44 rearward is substantially equal to the distance (X−A).

In other words, in shifting the valve mechanism 32 from the output increasing operation state to the output maintaining operation state, the length of the input member 28 under low temperature is made longer than the length of the input member 28 in the front and rear direction under normal temperature, that is the length from the front end portion of the first input member 281 to the atmospheric valve seat 28*a* of the second input member 282, by the distance Y.

By making the length of the input member 28 in the front and rear direction under low temperature longer than the length under normal temperature, the amount of bulging of the reaction disk 44 under low temperature which is deficient in comparison with the amount of bulging of the reaction disk 44 under normal temperature can be supplemented and so the output value at the input Fi1 under low temperature of the negative pressure servo unit 10 can be approximated to the output Fo1 under normal pressure. That is, in the input and output characteristics of the vacuum servo apparatus 10, the difference that exists when under normal temperature and under low temperature can be reduced and a variation in the input and output characteristics can be reduced.

When the rearwardly bulging length in accordance with elastic deformation of the reaction disk 44 under low temperature, which is deficient in comparison with the urging rearward bulging length in accordance with elastic deformation of the reaction disk 44 under normal temperature, corresponds to the distance Y, an amount of increasing or decreasing the length of the input member 28 in the front and rear directions in accordance with the temperature change is the distance Y. Accordingly, the output value at the input Fi1 under low temperature of the vacuum servo apparatus 10 can be made equivalent to or further approximated to the output Fo1 under normal temperature.

According to the present invention, the input member 28 constitutes a correcting means for supplementing the bulging amount of the reaction disk 44 under low temperature which is deficient in comparison with the bulging amount of the reaction disk 44 under normal temperature and making the atmosphere valve seat 28*a* and the atmospheric seal portion 33*a* at least relatively closely approximate each other.

As has been explained, according to the vacuum servo apparatus 10 of the present invention, even when the reaction disk 44 is hardened due to the lowering of the air temperature and accordingly the lowering of the temperature of the reaction disk 44 so that the elastic deformation amount of then reaction disk 44 is reduced in comparison with the elastic deformation amount under normal temperature, in relation to an increase or a decrease of the elastic deformation amount in accordance with the temperature change of the reaction disk 44, the length in the front and rear direction from the front end portion of the input member 28 to the atmospheric valve seat 28*a* under low temperature is made longer than that under normal temperature. Accordingly, the amount of elastic deformation of the reaction disk 44 under low temperature which is deficient in comparison with that under normal temperature can be supplemented. Therefore, the output under normal temperature and the output under low temperature can be approximated to each other and an always relatively stable output can be supplied.

Further, an increase or a decrease of a rearward bulging length in accordance with elastic deformation of the reaction disk 44 based on a change in temperature of the reaction disk 44 and an increase or a decrease in the length in the front and rear direction in accordance with elastic deformation of the rubber member 284*b* based on a change in temperature of the rubber member 284*b* of the input member 28 are made substantially equal to each other, whereby the rearward bulging length in accordance with the elastic deformation of the reaction disk 44 under low temperature which is deficient in comparison with that under normal temperature and the amount of increase of the length of the input member 28 in the front and rear direction under low temperature which is comparable to that under normal temperature, can further be approximated to each other. Therefore, the output under normal temperature and the output under low temperature can approximated to each other and an always relatively stable output can be supplied regardless of temperature.

Further, under normal temperature, the progress of the second input member 282 relative to the first input member 281 is restricted by bringing the front face of the outwardly-directed flange portion 283 of the second input member 282 into contact with the peripheral edge portion of the opening of the bottomed cylindrical portion 284*a*. The elastic deformation amount of the rubber member 284*b* can thus be set to the predetermined amount Y and so the amount of movement of the second input member 282 relative to the first input member 281 can firmly be set to the predetermined amount Y. By setting the predetermined amount Y in accordance with an increase or a decrease of the elastic deformation amount in accordance with a temperature change of the reaction disk, a variation in the input and output characteristics under normal temperature and under low temperature of the vacuum servo apparatus 10 can further be restrained and the predetermined amount Y can easily be set. Accordingly, the vacuum servo apparatus 10 is capable of reducing the variation in the input and output characteristics.

Although in this embodiment of the present invention, the vacuum servo apparatus 10 constitution is tandem type apparatus, the invention is not particularly limited to this construction. For example, a similar operation and effect may be achieved in the case of a vacuum servo apparatus according to the invention in which a single type construction is employed. Further, although according to this embodiment, an explanation has been given that the rubber member 284*b* is deformed by virtue of the first input member 281 regressing after rearwardly-bulging the reaction disk 44, the invention is not limited particularly to the operational embodiment but in sum the length of the input member 28 in the front and rear direction may be changed by elastically deforming the rubber member 284*b*.

Also, although the input member 28 in this described embodiment is constituted by the first input member 281 and the second input member 282, the invention is not limited to this construction. A similar operation and effect may be achieved with a construction in which input applied to the brake pedal 31 can be transmitted to the reaction disk 44, a contact portion capable of being brought into contact with the reaction disk 44 and the atmospheric valve seat 28*a* are provided, and the length of the reaction disk 44 in the front and rear direction according to an increase or a decrease of the elastic deformation amount in accordance with the temperature change thereof can be increased or decreased.

Additionally, although according to this embodiment, there is provided the input member 28 in which the correcting means supplements the amount of bulging of the reaction disk 44 under low temperature which is deficient in comparison with the amount of bulging of the reaction disk 44 under normal temperature, and at least the atmospheric valve seat 28*a* and the atmospheric seal portion 33*a* are made proximate to each other, the invention is not particularly limited to this construction but in sum, the amount of bulging the reaction disk 44 under low temperature which is deficient in comparison with the amount of bulging of the reaction disk 44 under normal temperature can be supplemented.

Further, although in this embodiment the first input member 281 of the input member 28 is divided into the front portion 281e incorporated in the center hole 22c and the rear portion 281f having the contact portion 284 and the recess portion 281d for being assembled to the power piston 22, other variations are possible. For example, a similar operation and effect may be achieved with a vacuum servo apparatus according in which the front portion 281e and the rear portion 281f are integrally constituted.

The reaction disk 44 and the rubber member 284b are described as being made of rubber, but other materials having elasticity and characteristics which cause the amount of elastic deformation to change based on an increase or decrease in the temperature or their own temperature can also be employed.

Figure 5:
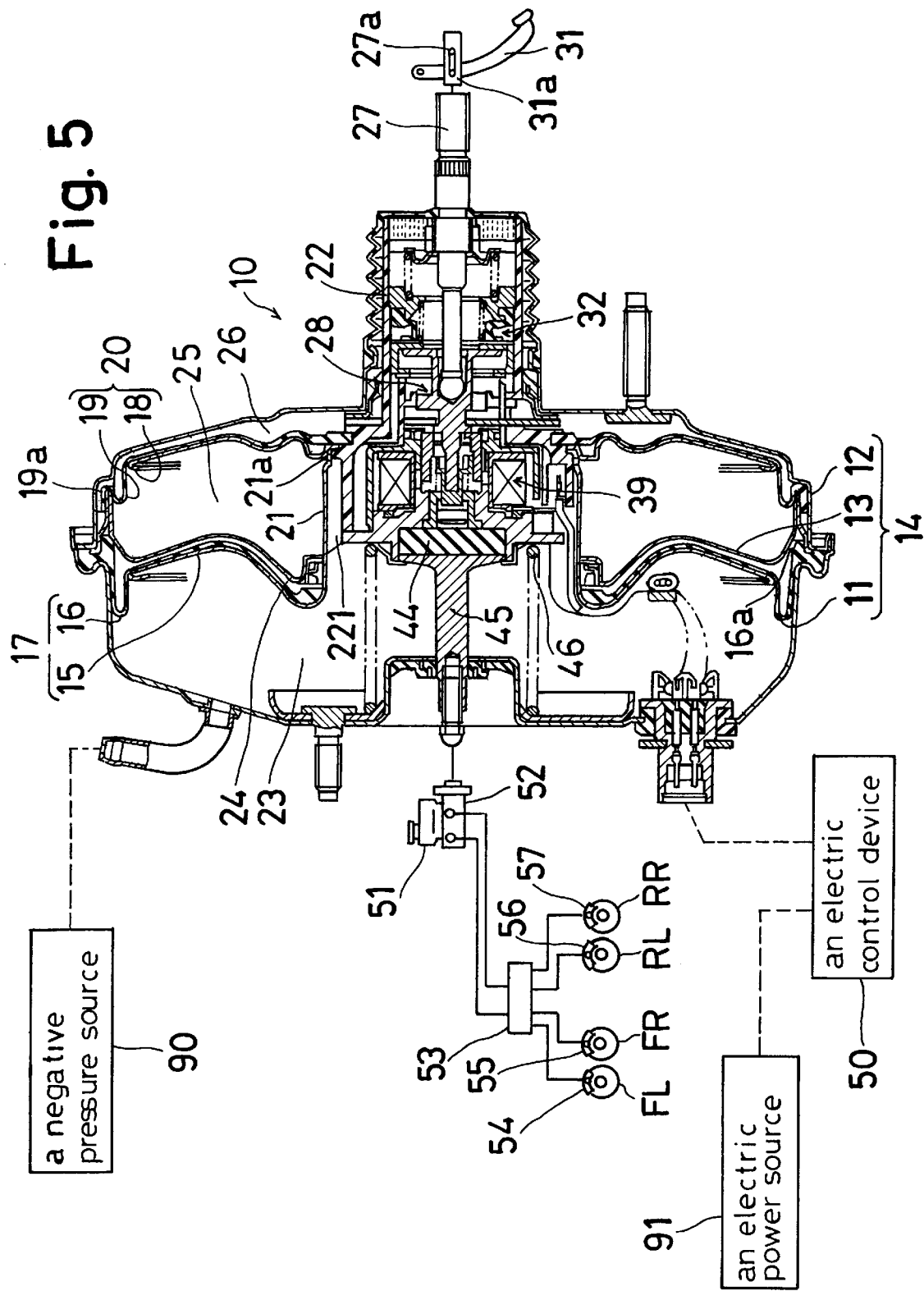
FIG. 5 is a cross-sectional view of the vacuum servo apparatus according to a second embodiment of the present invention.
Figure 6:
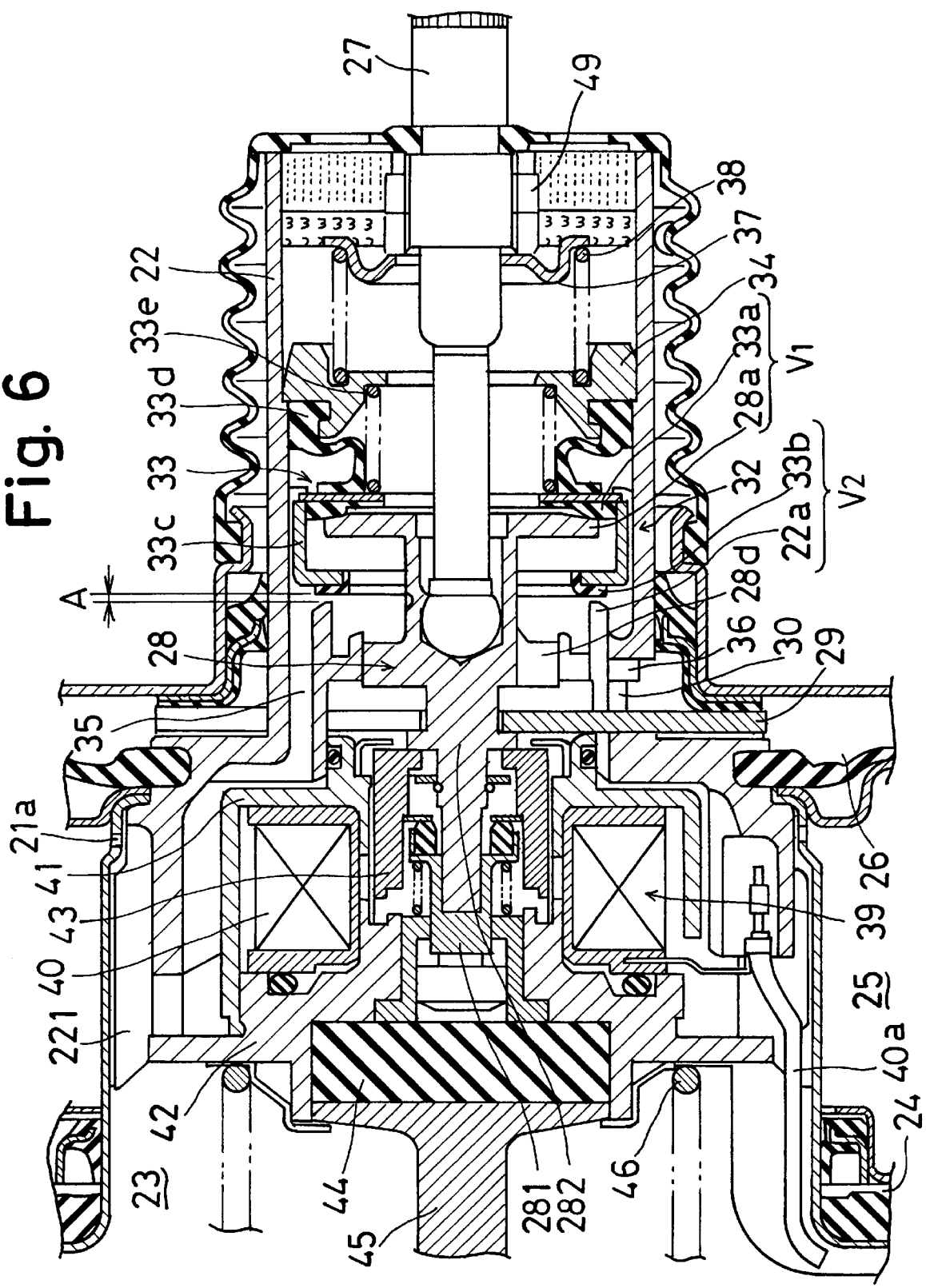
FIG. 6 is an enlarged view showing a portion of the valve mechanism used in the vacuum servo apparatus shown in FIG. 5.
Figure 7:
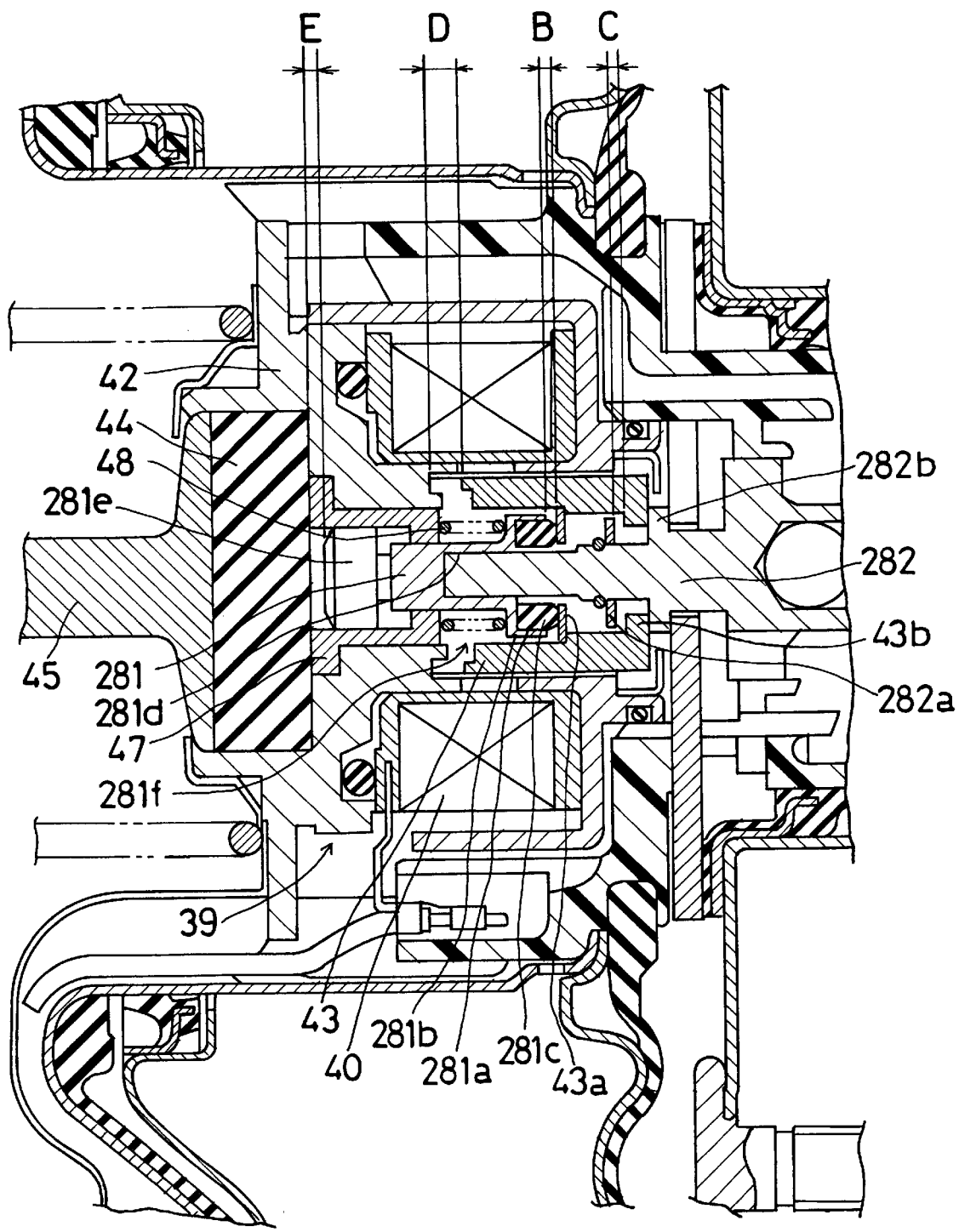
FIG. 7 is an enlarged cross-sectional view of a portion of the actuator used in the vacuum servo apparatus shown in FIG. 6.

A tandem type vehicular vacuum servo apparatus 10 according to a second embodiment of the present invention is shown in FIGS. 5–7. Features of the apparatus corresponding to those described above in connection with the first embodiment are designated by corresponding reference characters.

The vehicular vacuum servo apparatus 10 according to the second embodiment includes a housing 14 constituted by the front shell 11, the rear shell 12 and the partition wall member 13 between the two shells. A front side pressure chamber and a rear side pressure chamber are defined within the housing 14. The front side movable wall 17 is disposed within the front side pressure chamber in the housing 14. The front side movable wall 17 includes a front aide plate 15 made of a metal and a front side diaphragm 16 made of rubber. The rear side movable wall 20 is disposed in the rear side pressure chamber of the housing 14 and includes the rear side plate 18 made of a metal and the rear side diaphragm 19 made of rubber.

The central portion of the front plate 15 is integrally provided with a cylindrical portion 21 penetrating the central portion of the partition wall member 13 in an airtight and slidable manner. A bead portion at an inner peripheral edge of the front diaphragm 16 is fixed in an airtight manner to the outer peripheral face of the front end portion of the cylindrical portion 21 of the front plate 15, and a bead portion at the outer peripheral edge of the front diaphragm 16 is sandwiched in an airtight manner by outer peripheral portions of the shells 11, 12 along with the outer peripheral edge portion of the partition wall member 13.

The bead portion at the outer peripheral edge of the rear side diaphragm 19 is sandwiched in an airtight manner by the folded portion provided on the inner diameter side of the outer peripheral edge of the partition wall member 13 and the rear shell 12. A power piston 22 penetrates the central portion of the rear shell 12 in an airtight and slidable manner. The rear end of the cylindrical portion 21 of the front plate 15 and the inner peripheral edge portion of the rear plate 18 are fixed at the outer periphery of the front side portion of the power piston 22 and a bead portion of the inner peripheral edge of the rear diaphragm 19 is also fixed to the outer periphery of the power piston 22 in an airtight manner.

The front side pressure chamber in the housing 14 is thus divided into the first front chamber 23 and the first rear chamber 24, and the rear side pressure chamber in the housing 14 is divided into the second front chamber 25 and the second rear chamber 26. The first front chamber 23 communicates with an engine intake manifold constituting a negative pressure source 90 and is normally maintained at negative pressure. The second front chamber 25 is communicated with the first front chamber 23 by the hole 21a formed at the cylindrical portion 21 of the front side plate 15 and the groove 221 formed at the outer periphery of the front end portion of the power piston 22. Accordingly, the second front chamber 25 is also normally maintained at negative pressure.

The first rear chamber 24 is communicated with the second rear chamber 26 by the groove 16a formed at the inner peripheral face of the bead portion at the outer peripheral edge of the front side diaphragm 16, the hole 13a formed at the partition wall member 13 and the groove 19a formed at the outer peripheral face of the bead portion at the outer peripheral edge of the rear side diaphragm 19.

As shown in FIG. 5 and FIG. 6, the input rod 27 is positioned within the inner portion of the power piston 22 for forward and rearward movement relative to the power piston 22. The input rod 27 is connected to the input member 28 that is slidably guided in the front and rear directions (i.e., left and right direction in FIG. 2) by the power piston 22. The input rod 27 is connected to the input member 28 by the ball joint at the front end and is connected to the brake pedal 31 at its rear end.

The input member 28 is arranged on the front side in the power piston 22 and includes the first input member 281 whose front face is adapted to be brought into contact with the rear face of the reaction disk 44 and the second input member 282 arranged coaxially with the first input member 281 on the rear side of the first input member 281. The second input member 282 is connected with the input rod 27.

The first input member 281 is provided with the recess portion 281d at its rear portion that opens in the rear direction (i.e., the right direction in FIG. 6). The front end portion of the second input member 282 is positioned in the recess portion 281d of the first input member 281 for sliding movement in the front and rear direction. Accordingly, the first input member 281 is movable in the front and rear direction relative to the second input member 282. In the initial state shown in FIG. 6, the bottom face of the recess portion 281d of the first input member 281 is in contact with the front end face of the second input member 282.

The power piston 22 is installed with the key member 29 for defining the progress limit position and the regress limit position of the input member 28 relative to the power piston 22. The key member 29 is inserted into the radially directed hole 30 formed at the power piston 22 and is locked to the power piston 22 such that the key member 29 does not come off the power piston 22.

The inner portion of the power piston 22 is installed with the valve mechanism 32 that switches between the output reducing operation state for communicating the second rear chamber 26 with the first front chamber 23 and cutting off the second rear chamber 26 and the first front chamber 23 from the atmosphere, the output maintaining operation state for cutting off the second rear chamber 26 from the first front chamber 23 and from the atmosphere, and the output increasing operation state for cutting off the second rear chamber 26 from the first front chamber 23 and communicating the second rear chamber 26 with the atmosphere. The valve mechanism 32 switches between the various states in accordance with the position of the input member 28 in the front and rear direction relative to the power piston 22.

The valve mechanism 32 is constituted by the atmospheric valve seat 28a having a substantially ring-like shape formed integrally with the input member 28 and directed in the rear direction (i.e., the right direction in FIG. 2), the negative pressure valve seat 22a having a substantially ring-like shape formed integrally with the power piston 22 and directed in the rear direction, and the control valve 33. The control valve 33 is integrally provided with the atmospheric seal portion 33a having a substantially ring-like shape opposed to the atmospheric valve seat 28a for engaging and disengaging the atmospheric valve seat 28a, and the negative pressure seal portion 33b having a substantially ring-like shape opposed to the negative valve seat 22a for engaging and disengaging the negative valve seat 22a.

The control valve 33 is constituted by the movable portion 33c integrally installed with the atmospheric seal portion 33a and the negative pressure seal portion 33b, the fixed portion 33d fixed to the power piston 22 in an airtight manner by the retainer 34, and the valve spring 33e for urging the movable portion 33c in the front direction.

In the valve mechanism 32, the atmospheric seal portion 33a and the atmospheric valve seat 28a form the atmospheric valve V1, and the negative pressure seal portion 33b and the negative pressure valve seat 22a form the negative pressure valve V2.

The power piston 22 is formed with the vacuum path 35 for communicating the negative pressure valve V2 of the valve mechanism 32 with the first front chamber 23. The power piston 22 is also formed with the air path 36 for communicating the atmospheric valve of the valve mechanism 32 with the second rear chamber 26. In the power piston 22, the space on the inner peripheral side of the fixed portion 33d of the control valve 33 is communicated with the atmosphere via the rear opening of the power piston 22.

With this valve mechanism 32, by bringing the atmospheric valve seat 28a of the atmospheric valve V1 into contact with the atmospheric seal portion 33a, the second rear chamber 26 is cut off from the atmosphere, by separating the atmospheric valve seat 28a from the atmospheric seal portion 33a the second rear chamber 26 is communicated with the atmosphere, by bringing the negative pressure valve seat 22a of the negative pressure valve V2 into contact with the negative pressure seal portion 33b communication between the first front chamber 23 and the second rear chamber 26 is cut off, and by separating the negative pressure valve seat 22a from the negative pressure seal portion 33b the first front chamber 23 and the second rear chamber 26 are communicated with each other.

The spring 38 installed between the retainer 37 locked to the input rod 27 and the retainer 34 rearwardly urges the input rod 27 and thus the input member 28. When the brake pedal 31 is not depressed, that is in the initial state shown in FIG. 6, the spring 38 brings the atmospheric valve seat 28a in contact with the atmospheric seal portion 33a and holds the negative pressure seal portion 33b in a state in which the negative pressure seal portion 33b is separated from the negative pressure valve seat 22a. In the initial state, a clearance of a distance A is present between the negative pressure valve seat 22a and the negative pressure seal portion 33b.

An adjustment nut 49 is screwed to an outer peripheral portion of the input rod 27 as shown in FIG. 6 for setting the load of the spring 38. By rotating the adjustment nut 49, the distance between the retainer 34 and the retainer 37 can be increased or decreased and so the adjustment nut 49 can set the load of the spring 38.

An actuator 39 is installed at the inner portion of the front portion of the power piston 22. The actuator 39 is constituted by a solenoid coil 40, a yoke 41 comprised of a magnetic member, a fixed core 42 comprised of a magnetic member, and a movable core 43 comprised of a magnetic member.

As shown in FIGS. 6 and 7, the movable core 43 is arranged at the outer peripheral portion of the input member 28 for moving in the front and rear direction (i.e., the left and right direction in FIG. 6) relative to the power piston 22 and the input member 28. The movable core 43 is formed substantially in a cylindrical shape and is provided with a first inwardly directed flange portion 43a forming a first engaging portion that projects radially inwardly and a second inwardly-directed flange portion 43b forming a second engaging portion projecting radially inwardly.

A rear portion of the first input member 281 is provided with a first contact portion 281a forming a first engaged portion which is brought into contact with the first inwardly-directed flange portion 43a of the movable core 43. The first contact portion 281a is provided with a bottomed cylindrical portion 281b opening in the rear direction (i.e., the right direction in FIG. 7) and a ring-shaped rubber member 281c which is arranged in the bottomed cylindrical portion 281b. The front end portion of the rubber member 281c is adapted to be brought into contact with the bottom face of the bottomed cylindrical-portion 281b and the rear end of the rubber member 281c projects from a rearwardly facing opening of the bottomed cylindrical portion 281b.

The length of the rubber member 281c in the front and rear direction is greater than the depth of the hole of the bottomed cylindrical portion 281b in which the rubber member 281c is seated. In the initial state, a clearance of a predetermined amount B is provided between the rear end portion of the bottomed cylindrical portion 281b of the first input member 28 and the first inwardly-directed flange portion 43a of the movable core 43.

The rubber member 281c is made elastically deformable in the front and rear direction by being compressed in accordance with the progressing movement of the movable core 43. The elastic deformation characteristics of the rubber member 281c, that is the ease with which the elastic deformation occurs, changes in accordance with the air temperature and accordingly the temperature of the rubber member 281c itself. Comparing the ease with which deformation of the elastic member can be accomplished at a normal temperature of the rubber member 281c, for example, 20° C. through 25° C., with the ease with which deformation of the elastic member can be accomplished at a low temperature, for example, −25° C. through −30° C., the rubber member 281c is more difficult to deform at the lower temperature of the rubber member 281c.

In other words, when the same operational force is exerted on the rubber member 281c under a normal temperature and under a low temperature, a comparison of the amount of elastic deformation that occurs under normal temperature of the rubber member 281c and the amount of elastic deformation that occurs under low temperature reveals that the amount of elastic deformation under low temperature is smaller.

The second input member 282 is provided near its front portion with a first outwardly-directed flange portion 282a forming a second engaged portion projecting radially outwardly. In the initial state shown in FIG. 7, a clearance of a predetermined amount C is provided between the first outwardly directed flange portion 282a and the second inwardly-directed flange portion 43b of the movable core 43.

The second input member 282 is also provided with a second outwardly-directed flange portion 282b engaged with the second inwardly-directed flange portion 43b of the movable core 43. In the initial state, the second outwardly-directed flange portion 282b is engaged with the second inwardly-directed flange portion 43b of the movable core 43.

A spring 48 is arranged between the rear end portion of a guide member 47 that is arranged in a small diameter portion of a stepped hole formed in the fixed core 42 and the first contact portion 281a of the first input member 281. The spring 48 urges the movable core 43 rearwardly via the first input member 281 and brings the rear face of the second outwardly directed flange portion 43b of the movable core 43 into contact with the front face of the second outwardly-directed flange portion 282b of the second input member 282 in the initial state.

Accordingly, the movable core 43 is adapted to progress and regress (i.e., move axially) integrally with the input member 28 relative to the power piston 22. The guide member 47 slidably supports the first input member 281 in the front and rear direction.

The solenoid coil 40 is arranged at the outer peripheral portion of the movable core 43, and the solenoid coil 40, the yoke 41 and the fixed core 42 are fixed to the power piston 22. The solenoid coil 40 is electrically connected to an electronic power source 91 through an electric control device 50 located outside of the housing 14 by a lead wire 40a.

When electricity is not conducted to the solenoid coil 40 (i.e., when the actuator 39 is not operated), a clearance of a predetermined amount D is present between the front end face of the movable core 43 and the fixed core 42.

When electricity is conducted to the solenoid coil 40 (i.e., when the actuator 39 is operated), an electromagnetic force is generated between the fixed core 42 and the movable core 43, and the movable core 43 is moved forwardly by the electromagnetic force. A maximum amount of progress or forward movement of the movable core 43 corresponds to the distance D of the clearance between the fixed core 42 and the movable core 43.

The reaction disk 44 possessing a circular disk shape and comprising rubber is installed in a large-diameter portion of the stepped hole formed at the front end face of the fixed core 42. The front side of the reaction disk 44 contacts the rear end portion of the output rod 45 which extends through the central portion of the front shell 11 of the housing 14 in an airtight and slidable manner.

As is well known, the reaction disk 44 transmits the progressive force of the power piston 22 and the progressive force of the input member 28 to the output rod 45 and exerts a reaction force having a magnitude corresponding to the output from the output rod 45 to cause the input member 28 to regress or move rearward. Further, the reaction disk 44 possesses a characteristic similar to that of the rubber member 281c of the first input member 281 in that the elastic deformation characteristics change in accordance with air temperature and accordingly the temperature of the reaction disk 44.

When temperature of the reaction disk 44 is a normal temperature (20° C. through 25° C.), the reaction disk 44 is able to rather easily elastically deform, but it is rather difficult to elastically deform the reaction disk 44 at low temperature (−25° C. through −30° C.). In other words, when the same operational force is exerted on the reaction disk 44 under normal temperature and under low temperature, the amount of elastic deformation of the reaction disk 44 under low temperature is smaller than that under normal temperature. In the initial state, a clearance of a predetermined amount E is present between the rear face of the reaction disk 44 and the front end face of the input member 28 (i.e., the front end face of the first input member 281).

The return spring 46 is installed at the central portion of the first front chamber 23 for causing the power piston 22 and the two movable walls 17, 20 coupled thereto regress relative to the housing 14.

The output rod 45 is operationally connected to a piston of the master cylinder 51. The master cylinder 51 is provided with the reservoir tank 52 and the master cylinder 51 is connected with the actuator portion 53 for ABS control (antilock brake system), TRC (traction control) and brake steering control via hydraulic pipes, and the actuator portion 53 is connected with the wheel cylinders 54, 55, 56, 57 arranged at the respective wheels FR, FL, RR and RL via hydraulic pipes.

As seen in FIG. 6, the rear end portion of the input rod 27 is formed with a slit 27a which extends in the front and rear direction. Both ends of the slit 27a are closed and the slit 27a receives an engaging shaft 31a of the brake pedal 31 that is able to slide in the front and rear direction. In the initial state shown in FIG. 5, the engaging shaft 31a engages with the front side closed end portion of the slit 27a.

Figure 8:
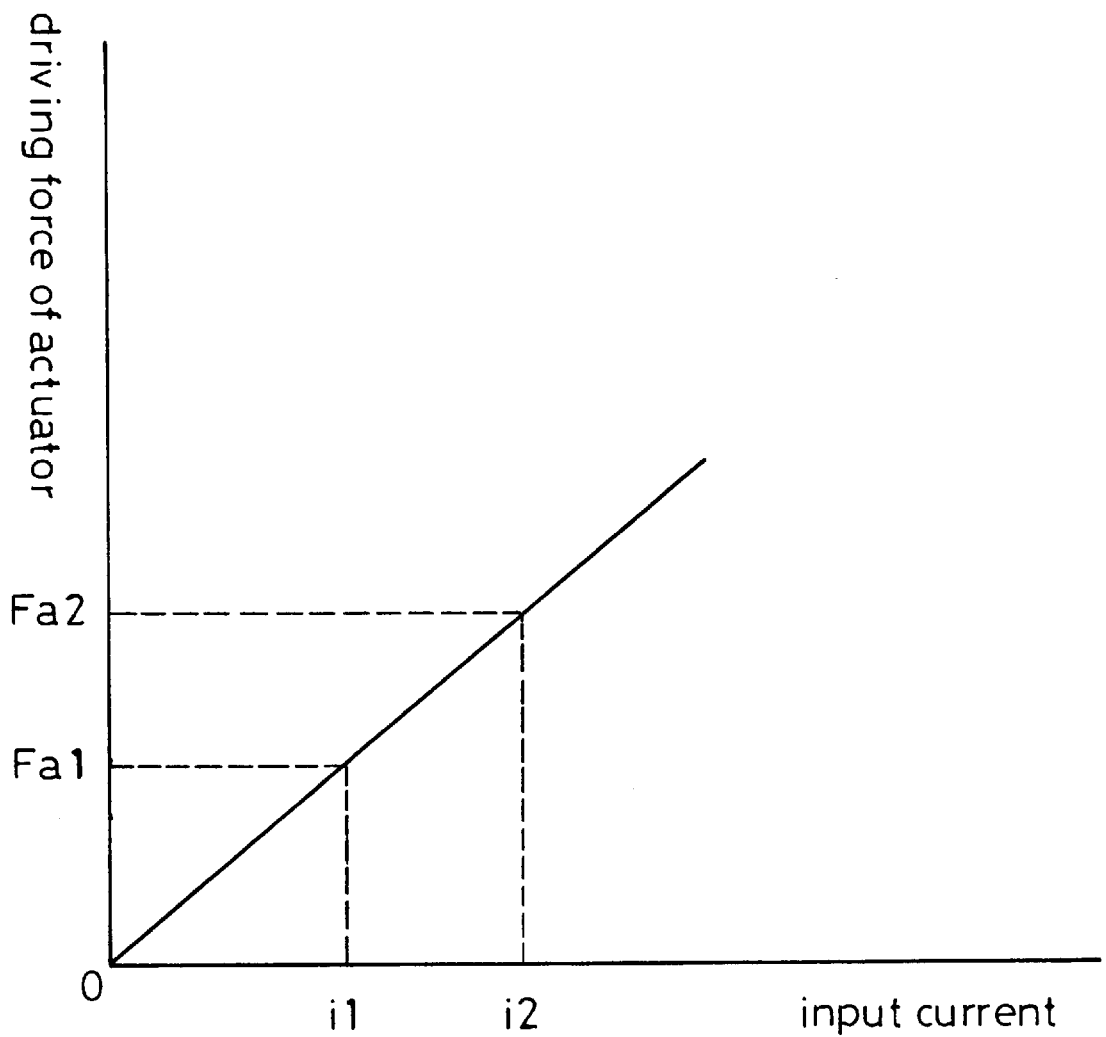
FIG. 8 is a diagram the relationship between current and drive force of the actuator used in the second embodiment of the vacuum servo apparatus.

FIG. 8 is a diagram of illustrating the relationship between current i flowing in the solenoid 40 and the drive force Fa of the actuator 39 in the vacuum servo apparatus 10 according to this embodiment of the present invention. As shown in FIG. 8, when current i1 is conducted to the solenoid 40, the drive force of the actuator 39 becomes Fa1 and when the current i2 is conducted to the solenoid 40, the drive force of the actuator 30 becomes Fa2.

Having described the features associated with the vacuum servo apparatus of the present invention, the manner of operation will now be described. The state shown in FIGS. 5–7 is the state in which the brake pedal 31 is not depressed and the actuator 39 is not operated, and the valve mechanism 32 is in the output reducing operation state in which the second rear chamber 26 is communicated with the first front chamber 23 and is cut off from the atmosphere. That is, the atmospheric valve seat 28a is in contact with the atmospheric seal portion 33a and the negative pressure valve seat 22a is separated from the negative pressure seal portion 33b, and the pressure of the first rear chamber 24 and the second rear chamber 26 is lowered to a pressure that is the same as the pressure of the first front chamber 23.

Accordingly, no progressive force is applied to the two movable walls 17, 20, and the power piston 22 and the power piston 22 and the two movable walls 17, 20 coupled to the power piston are maintained at the regress limit position relative to the housing 14 by the return spring 46.

The relationship among the respective clearances iii the initial state shown by FIG. 5 through FIG. 7 is A<E, C<E, E<D, B<C and E+B<D.

Figure 9:
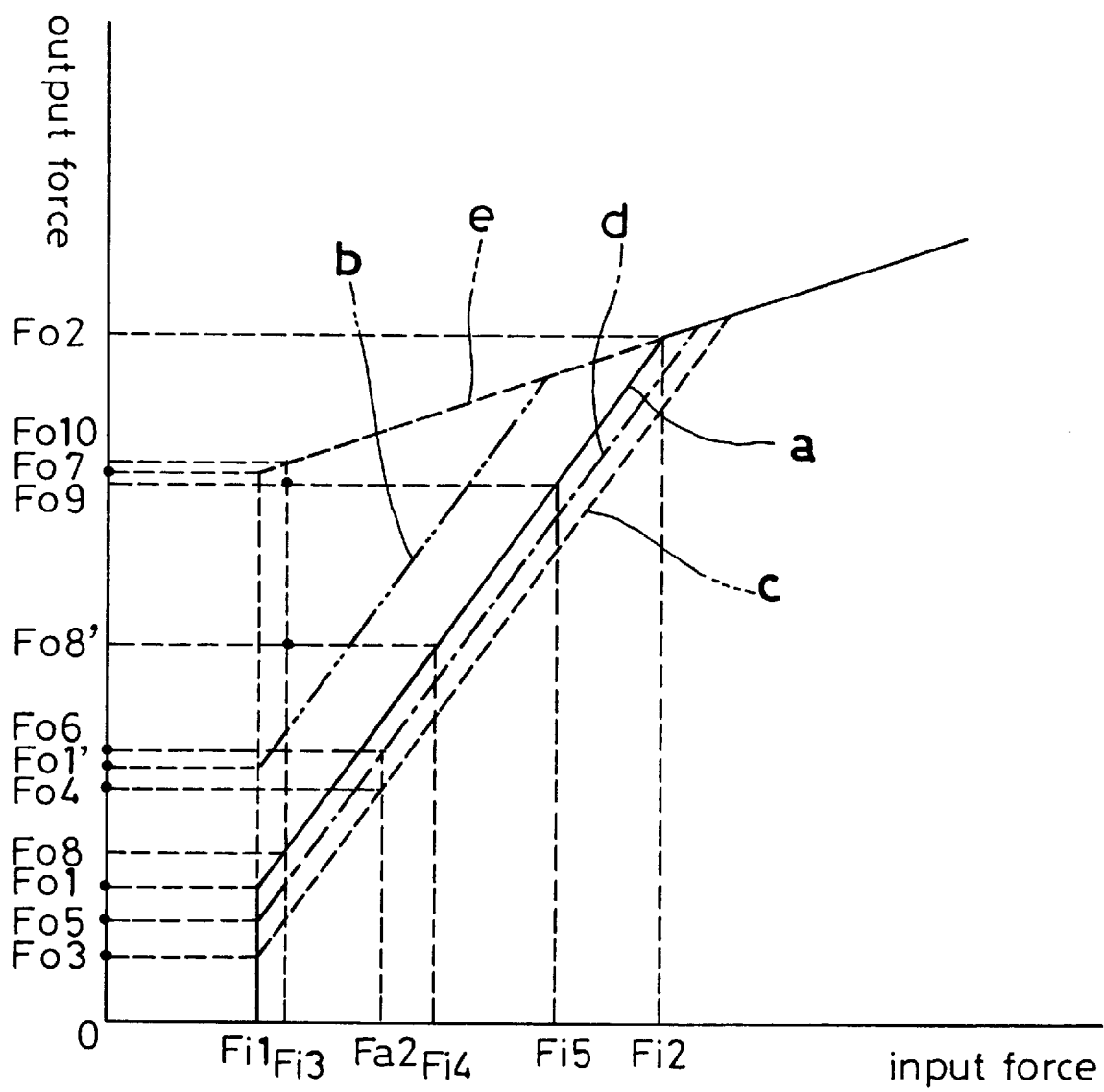
FIG. 9 is a diagram illustrating the input and output characteristics of the vacuum servo apparatus according to the second embodiment.

FIG. 9 is a diagram illustrating the input and output characteristics of the vacuum servo apparatus 10 according to this embodiment in which the ordinate represents the output and the abscissa represents then input. When the driver depresses the brake pedal 31 with an input of Fi1 for normal braking operation in the case in which the air temperature, and accordingly the temperature of the reaction disk 44 and the rubber member 281c, is a normal temperature (for example, 20° C. through 25° C.), because the engaging shaft portion 31a of the brake pedal 31 is engaged with the front side closed end portion of the slit 27a of the input rod 27, the input rod 27 progresses relative to the power piston 22.

By virtue of the progress or forward movement of the input rod 27, the second input member 282 of the input member 28 progresses integrally with the input rod 27, and the progressing movement of the second-input member 282 causes the bottom face of the recess portion 281d of the first input member 281 to be pressed by the front end portion of the second input member 282. Accordingly, in accordance with the progress of the second input member 282, the first input member 281 also progresses integrally with the second input member 282 and the input rod 27. That is, the input member 28 integrally moves.

Further, the front face of the second outwardly directed flange portion 282b of the second input member 282 is brought into contact with the rear face of the second inwardly-directed flange portion 43b of the movable core 43 and accordingly, in accordance with the progressing movement of the input member 28, the movable core 43 progresses or moves forward integrally with the input member 28 relative to the power piston 22.

Based on the movement of the input member 28, the movable portion 33c of the control valve 33 is urged forwardly by the valve spring 33e and progresses integrally with the input member 28, and the negative pressure seal portion 33b of the control valve 33 is brought into contact with the negative pressure valve seat 22a of the power piston 22. The negative pressure valve V2 is thus closed. At this time, the clearance between the rear face of the reaction disk 44 and the front end portion of the input member 28, that is, the front end portion of the first input member 281, becomes (E–A).

By closing the negative pressure valve V2, communication between the vacuum path 35 and the air path 36 is cut off and the second rear chamber 26 is cut off from the first front chamber 23. That is, the valve mechanism 32 is switched from the output reducing operation state to the output maintaining operation state.

When the input rod 27 and the input member 28 progress further from the state in which the valve mechanism 32 is brought into the output maintaining operation state by a distance α, the atmospheric valve seat 28a of the input member 28 is separated from the atmospheric seal portion 33a of the control valve 33 by the distance α, and the atmospheric valves V1 is opened. At this time, the clearance between the rear face of the reaction disk 44 and the front end face of the input member 28, that is, the front end face of the first input member 281, becomes (E–A–α).

By opening the atmospheric valve V1, the air path 36 is communicated with the atmosphere via an axial direction hole 28d formed at the second input member 282 and the clearance between the atmospheric valve seat 28a and the atmospheric seal portion 36a, whereby the second rear chamber 26 is communicated with the atmosphere and the valve mechanism 32 is switched to the output increasing operation state.

By switching the valve mechanism 32 to the output increasing operation state, atmospheric air flows into the second rear chamber 26 and further flows from the second rear chamber 26 into the first rear chamber 24, the pressure in the two rear chambers 24, 26 is increased. Thus, a progressive force is produced at the first movable wall 17 by the pressure difference between the first front chamber 23 and the first rear chamber 24, a progressive force is produced at the second movable wall 20 by the pressure difference between the second front chamber 25 and the second rear chamber 26, and a progressive force is produced at the power piston 22 by the pressure difference between the first front chamber 23 and the second rear chamber 26.

These progressive forces are transmitted from the power piston 22 to the output rod 45 via the fixed core 42 of the actuator 39. The reaction disk 44, the two movable walls 17, 20, the power piston 22 and the output rod 45 integrally start progressing relative to the housing 14 and operation of the master cylinder 51 is started.

At this time, the power piston 22 progresses also relative to the input member 28 and the atmospheric seal portion 33a of the control valve 33 approaches the atmospheric valve seat 28a. Further, to fill the clearance of the distance (E–A–α) between the reaction disk 44 and the input member 28 which has been produced at a point in time when the atmospheric valve seat 28a has been separated from the atmospheric seal portion 33a and the clearance between the reaction disk 44 and the input member 28 which is newly produced in making the power piston 22 progress relative to the input member 28 in accordance with the state in which the valve mechanism 32 is brought into the output increasing operation state, the reaction disk 44 is compressed to deform by the power piston 22 and the output rod 45. The reaction disk 44 thus bulges rearwardly into the small diameter portion of the stepped hole of the fixed core 42, that is the center hole of the guide member 47.

By virtue of the movement of the power piston 22 relative to the input member 28, the atmospheric seal portion 33a of the control valve 33 is again brought into contact with the atmospheric valve seat 28a, communication between the air path 36 and the atmosphere is cut off and the flow of atmospheric air into the two rear chambers 24, 26 is stopped (the valve mechanism 32 is switched to the output maintaining operation state).

The amount of regress or rearward movement of the input member 28 relative to the power piston by shifting the valve mechanism 32 from the output increasing operation state to the output maintaining operation state is substantially equal to the separation amount α between the atmospheric valve seat 28a and the atmospheric seal portion 32a. Further, the amount of rearward bulging of the reaction disk 44 in shifting the valve mechanism 32 from the output increasing operation state to the output maintaining operation state is substantially equal to the distance (E–A).

Further, in shifting the valve mechanism 32 from the output increasing operation state to the output maintaining operation state, by the rearward bulging of the reaction disk 44, the reaction disk 44 and the front end portion of the input member 28 are brought into contact with each other. However, the reaction disk 44 does not exert a reaction force in correspondence with the output from the output rod 45 to the input member 28.

At this time, the input force exerted from the brake pedal 31 to the input member 28 by the driver is provided with the value Fi1 shown in FIG. 9 and the output force exerted from the output rod 45 to the master cylinder 51 possesses a value Fo1 shown in FIG. 9.

That is, there is performed a "jumping" in which the input member 28 is shifted from the output value 0 to the output value Fo1 without receiving the reaction force from the reaction disk 44 at the constant input value of Fi1. The output Fo1 in accordance with this "jumping" (jumping output) is dependent on the amount of bulging of the reaction disk 44 which is substantially equal to the distance (E–A).

Figure 10:
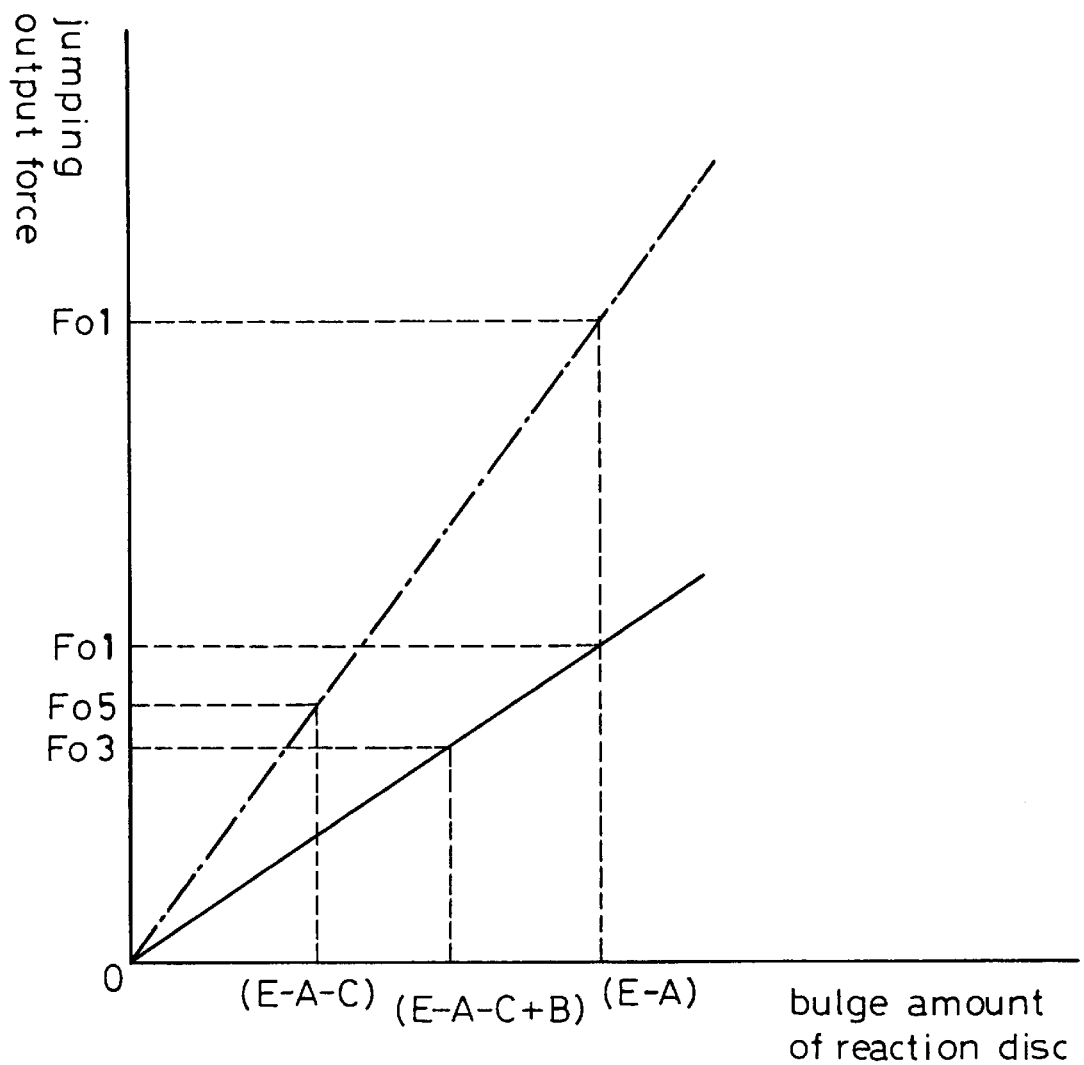
FIG. 10 is a diagram showing the relationship between the bulge amount and the jumping output of the reaction disk of the vacuum servo apparatus according to the second embodiment.

FIG. 10 is a diagram illustrating the jumping characteristics in which the abscissa represents the rearward bulging amount of the reaction disk 44 and the ordinate represents the output in "jumping" operation. That is, as shown by in FIG. 10, in the "jumping" operation of the vacuum servo apparatus 10, the smaller the amount of the bulging of the reaction disk 44 (in this case, the rearward bulging length of the reaction disk 44), the more reduced is the output in "jumping", and the larger the bulging amount, the more increased is the jumping output.

Further, the jumping output is dependent also on the characteristics of elastic deformation of the reaction disk 44. That is, the amount of elastic deformation of the reaction disk 44 is changed by a change in air temperature and accordingly the temperature of the reaction disk 44. The amount of rearward bulging of the reaction disk 44 under low temperature (for example, −25° C. through −30° C.) is smaller than the bulging amount under the normal temperature mentioned above.

Therefore, in the jumping operation of the vacuum servo apparatus 10, although the amount of bulging of the reaction disk 44 which is required for shifting the valve mechanism 32 from the output increasing operation state to the output maintaining operation state is (E−A), the output required for producing the bulging amount (E−A) in the reaction disk 44 under low temperature is increased more than that under normal temperature. That is, the behavior follows a characteristic line shown by the bold line under normal temperature and follows a characteristic line shown by a one-dotted chain line under low temperature. Under low temperature, the output becomes larger than that under normal temperature with the same input. That is, when under low temperature, the input Fi1 is applied to the brake pedal 31, the input rod 27 and the input member 28, and the vacuum servo apparatus 1 outputs an output Fo1' as the jumping output.

When the output Fo1 is produced and the valve mechanism 32 is brought into the output maintaining operation state, in the case in which the input applied from the brake pedal 31 to the input member 28 by the operator is increased to, for example, a value less than Fi2 in FIG. 9, the first input member 281 and the second input member 282 integrally progress relative to the power piston 22. That is, the input member 28 progresses relative to the power piston 22, the atmospheric valve seat 28a is again separated from the atmospheric seal portion 33a of the control valve 33, and the atmospheric valve V1 is opened (the valve mechanism 32 is switched to the output increasing operation state). Therefore, atmospheric air flows into the two rear chambers 24, 26, the pressure in the rear chambers 24, 26 is increased, the progressive forces of the movable walls 17, 20 and the power piston 22 are increased, and the two movable walls 17, 20, the power piston 22 and the output rod 45 further progress relative to the housing 14.

Further, when the power piston 22 progresses relative to the input member 28, and in accordance with the progress of the power piston 22 the reaction disk 44 exerts the reaction force to the input member 28 and rearwardly moves in an integral manner the first input member 281 and the second input member 282, that is the input member 28, the atmospheric seal portion 33a of the control valve 33 approaches the atmospheric valve seat 28a. The atmospheric valve seat 28a is again brought into contact with the atmospheric seal portion 33a of the control valve 33 and the atmospheric valve V1 is thus closed. That is, the flow of the atmospheric air into the two rear chambers 24, 26 is stopped (the valve mechanism 32 is switched to the output maintaining operation state) and the progressive forces of the two movable walls 17, 20 and the power piston 22 stop increasing. At this time, the output produced by the vacuum servo apparatus 10 becomes the output along the operational line a in FIG. 9.

Under the state in which the valve mechanism 32 is brought into the output maintaining operation state, for example when the input applied from the brake pedal 31 to the input member 28 is reduced to a value larger than Fi1 in FIG. 9, the input member 28 is made to regress or move rearward relative to the power piston 22. In accordance with the regressing movement of the input member 28, the movable portion 33c of the control valve 33 regresses relative to the power piston 22, the negative pressure seal portion 33b is separated from the negative pressure valve seat 22a and the negative pressure valve seat V2 is opened (the valve mechanism 32 is switched to the output reducing operation state).

By separating the negative pressure valve seat 22a from the negative pressure seal portion 33b, the vacuum path 35 is communicated with the air path 36 via the clearance between the negative pressure valve seat 22a and the negative pressure seal portion 33b. The two rear chambers 24, 26 are thus communicated with the first front chamber 23, the atmosphere in the two rear chambers 24, 26 is exhausted by the negative pressure source via the first front chamber 23, and the pressure of the two rear chambers 24, 26 is reduced.

Accordingly, the progressive forces of the two movable walls 17, 20 and the power piston 22 are reduced and the movable walls 17, 20, the power piston 22 and the output rod 45 regress relative to the housing 14. At this time, the power piston 22 also regresses relative to the input member 28, the negative pressure valve seat 22a approaches the negative pressure seal portion 33b of the control valve 33, and finally the negative pressure valve seat 22a is brought into contact with the negative pressure seal portion 33b. The negative pressure valve V2 is thus closed. Accordingly, the flow of atmospheric air from the two rear chambers 24, 26 to the first front chamber 23 is stopped (the valve mechanism 32 is switched to the output maintaining operation state) and the progressive forces of the two movable walls 17, 20 and the power piston 22 stop being reducing.

At this time, the output produced by the vacuum servo apparatus 10 becomes the output along the operational line a in FIG. 9. That is, in normal operation under normal temperature, within a range of the input of Fi1 through Fi2, the input and output characteristics of the vacuum servo apparatus 10 follow the operational line a.

The value Fi2 of the input shown in FIG. 9 has an input value by which the pressure of the two rear chambers 24, 26 becomes atmospheric pressure in normal operation under normal temperature. Within the range of the input from the value Fi1 through the value Fi2, the amount of change of the output applied from the output rod 45 to the master cylinder 51 is larger than the amount of change of the input applied to the input member 28. The ratio of the output to the input, that is the inclination of the operational line a in FIG. 9 coincides with the ratio of the area of the rear face of the reaction disk 44 to the area of the rear face of the reaction disk 44 that is brought into contact with the front end face of the input member 28.

In FIG. 9, the output in the case of the input having the value Fi2 is Fo2. When the input is further increased from the value Fi2, the output is increased by an amount corresponding to the increase in the input. Further, in FIG. 9, the amount of changing force per unit length of the ordinate is larger than the amount of change of force per unit length of the abscissa. When a line is drawn by making the amount of change of force per unit length of the ordinate coincide with the amount of change of force per unit length of the abscissa, a line indicating the correlation between the input and the output in the situation where the input is larger than the value Fi2, possesses a slope of 45 degree.

In normal operation under low temperature, within the range of the input of Fi1 through Fi2, according to the input and output characteristics of the vacuum servo apparatus 10, the jumping output makes a value of Fi1' and the inclination thereof follows the operational line b having the inclination the same as that of the operational line a.

In the situation in which the air temperature, and accordingly the temperature of the reaction disk 44 and the rubber member 281c, is normal temperature, for example, when the ECU (Electronic Control Unit) of the actuator portion 53 detects that a vehicle is brought into an oversteered state while turning the vehicle to the left, without braking operation of the driver, there is started the well-known operation of brake steering control (oversteering restraining control) in which brake hydraulic pressure is applied from a pump unit of the actuator portion 53 to the outer side front wheel of turning, that is the right front wheel FR in this example.

While the operation of brake steering control is started at the actuator portion 53, there is carried out a pre-stage pressurizing operation in which the electronic control device 50 operates the actuator 39 by supplying power from power supply to the solenoid coil 40. That is, the actuator 39 is operated in a state in which there is carried out no operation to the brake pedal 31, the input rod 27 and the input member 28 by the driver (i.e., there is no input from the driver).

When the electronic control device 50 controls the solenoid coil 40 by conducting current at a level il, an electromagnetic force is generated between the movable core 43 and the fixed core 42, and the movable core 43 is made to progress relative to the power piston 22 against the urging force of the spring 48. In accordance with the movement of the movable core 43, the first input member 281 engaged with the first inwardly-directed flange portion 43a of the movable core 43 via the contact portion 281a progresses relative to the power piston 22 and the second input member 282.

By virtue of the movement of the movable core 43 relative to the power piston 22 and the second input member 282 by the distance C, the front face of the second inwardly-directed flange portion 43b of the movable core 43 is engaged with the rear face of the first outwardly-directed flange portion 282a of the second input member 282 and so the second input member 282 also progresses by the movement of the movable core 43. That is, the movable core 43 and the input member 28 integrally progress relative to the power piston 22.

At this time, a clearance of distance C is produced between the bottom face portion of the recess portion 281d of the first input member 281 and the front end face of the second input member 282, and the clearance between the rear face of the reaction disk 44 and the front portion of the input member 28, that is the front face portion of the first input member 281, becomes the distance (E–C).

The movement of the movable core 43 and the input member 28 causes the input rod 27 integrally connected with the input member 28 to also progress relative to the power piston 22. That is, the movable core 43, the input member 28 and the input rod 27 progress against the urging forces of the spring 38 and the spring 48.

When the movable core 43 further progresses by the distance (E–C), the movable core 43 and the input member 28 integrally progress, and the front end portion of the input member 28 is brought into contact with the rear face of the reaction disk 44. That is, the clearance between the reaction disk 44 and the input member 28 is nullified.

Under normal temperature, the rubber member 281c of the first input member 281 is elastically deformed easily in the front and rear direction. Accordingly, the movable core 43 can be made to further progress while the reaction disk 44 is being brought into contact with the input member 28. Accordingly, by further progress of the movable core 43, the rubber member 281c of the first contact portion 281a of the first input member 281 is compressed in the front and rear direction and the second input member 282 further progresses.

The progressing movement of the movable core 43 and the second input member 282 in accordance with the elastic deformation of the rubber member 281c relative to the first input member 281 is restricted by the front end portion of the movable core 43 being brought into contact with the peripheral edge portion of the opening of the bottomed cylindrical portion 281b of the first contact portion 281a in the first input member 281. That is, the bottomed cylindrical portion 281b restricts the amount of elastic deformation of the rubber member 281c to the predetermined amount B. Therefore, the movable core 43 and the second input member 282 progress relative to the first input member 281 by the distance B.

The clearance between the bottom face portion of the recess portion 281d of the first input member 281 and the front end portion of the second input member 282 at a point in time where the front end portion of the movable core 43 is brought into contact with the peripheral edge portion of the opening of the bottomed cylindrical portion 281b is equal to the distance (C–B).

At this time, the drive force produced at the actuator 39 is Fa1 which is equal to the input value Fi1, and the input member 28 is moved to progress by the drive force Fa1 of the actuator 39. In other words, this state is substantially equal to the state in which the input member 28 is applied with the input Fi1 (=Fa1) by the driver.

Further, an amount of movement of the second input member 282 from the initial state relative to the power piston 22 in accordance with the progress of the movable core 43 becomes substantially equal to the distance (E–C+B).

By virtue of the progressing movement of the input member 28, that is the second input member 282, by the distance (E–C+B), the negative pressure seal portion 33b of the control valve 33 is brought into contact with the negative pressure valve seat 22a, the negative pressure valve V2 is closed, communication between the vacuum path 35 and the air path 36 is cut off, communication between the first front chamber 23 and the second rear chamber 26 is cut off, and the valve mechanism 32 is brought into the output maintaining operation state. Further, the atmospheric valve seat 28a of the input member 28 is separated from the atmospheric seal portion 33a of the control valve 33, the atmospheric valve VI is opened and the valve mechanism 32 is brought into the output increasing operation state. The clearance between the atmospheric valve seat 28a and the atmospheric seal portion 33a is substantially equal to a distance (E–C+B–A).

Further, the fixed core 42 is not brought into contact with the movable core 43 and a clearance of the distance (D–E–B) is present between the fixed core 42 and the movable core 43.

When the valve mechanism 32 is brought into the output increasing operation state, atmospheric air flows into the two rear chambers 24, 26 via the clearance between the atmospheric valve seat 28a and the atmospheric seal portion 33a, the axially extending hole 28d and the air path 36. The pressure in the rear chambers 24, 26 is thus increased and the progressive forces are produced at the two movable walls 17, 20 and the power piston 22.

The progressive forces of the two movable walls 17, 20 and the power piston 22 are transmitted from the power piston 22 to the output rod 45 via the fixed core 42 of the actuator 39 and the reaction disk 44, the two movable walls 17, 20, the power piston 22, the actuator 39, the input member 28, the input rod 27 and the output rod integrally start progressing relative to the housing 14 and the operation of the master cylinder 51 is started.

When the input rod 27 progresses relative to the housing 14 in accordance with the driving operation of the actuator 39, the engaging shaft 31*a* of the brake pedal 31 regresses or moves rearwardly in the slit 27*a* of the input rod 27 relative to the input rod 27. Further, with the regress of the engaging shaft portion 31*a* in the slit 27*a*, the engaging shaft portion 31*a* is not engaged with the closed end portion on the rear side of the slit 27*a*. Accordingly, the brake pedal 31 is not moved from the initial position shown by FIG. 5 in accordance with the progress of the input rod 27.

As the power piston 22 progresses relative to the housing 14, the reaction disk 44 is compressed to deform by the power piston 22 and the output rod 45 and is bulged rearwardly. The reaction disk thus advances into the small diameter portion of the stepped hole of the fixed core 42, that is in the center of the guide member 47. The reaction disk 44 transmits the progressive force of the power piston 22 and the progressive force of the input member 28 to the output rod 45 and exerts a reaction force in accordance with the output from the output rod 45 to the input member 28 to thereby make the input member 28 regress or move rearward relative to the power piston 22.

When the first input member 281 receives the reaction force from the reaction disk 44 and regresses against the force between the fixed core 42 and the movable core 43 which is produced by conducting electricity to the solenoid coil 40 (i.e., the drive force of the actuator 39), the second input member 282 is urged rearwardly by the spring 38 via the input rod 27 and the second input member 282 integrally regresses in accordance with the regressing movement of the movable core 43 and the first input member 281.

That is, the movable core 43 and the input member 28 integrally regress while maintaining engagement between the second inwardly-directed flange portion 43*b* of the movable core 43 and the first outwardly-directed flange portion 282*a* of the second input member 282 and while maintaining the clearance of the distance (C–B) between the first input member 281 and the second input member 282.

By making the input member 28 regress relative to the power piston 22 through application of the reaction force from the reaction disk 44, the atmospheric seal portion 33*a* of the control valve 33 is again brought into contact with the atmospheric valve seat 28*a*. Communication between the air path 36 and the atmosphere is thus cut off and the flow of atmospheric air into the two rear chambers 24, 26 is stopped (the valve mechanism 32 is switched to the output maintaining operation state).

At this time, the rear bulging amount of the reaction disk 44 is substantially equal to the separation amount between the atmospheric valve seat 28*a* and the atmospheric seal portion 33*a* (E–C+B–A).

Also at this time, the input member 28 receives the drive force Fa1 from the actuator 39 which is equal to the input Fi1, which is substantially equal to the state in which "jumping" is operated in the vacuum servo apparatus 10 by the input Fi1 during the normal braking operation.

Accordingly, as mentioned above, the output upon "jumping" is dependent on the amount of bulging of the reaction disk 44, the bulging amount of the reaction disk 44 in accordance with operation of the actuator 39 (E–A–C+B) is smaller than the bulging amount of the reaction disk 44 in the normal operation under normal temperature (E–A) and accordingly, the output in accordance with operation of the actuator 39 becomes smaller than the "jumping" output in the normal operation. That is, the output Fo3 disposed on the characteristic line shown by the bold line in FIG. 9 and smaller than the output Fo1 is outputted to the master cylinder 51. In other words, the output Fo3 is outputted in a state in which there is no input from the driver.

Further, particularly when the valve mechanism 32 is shifted from the output increasing operation state to the output maintaining operation state, the clearance of the distance (C–B) is present between the first input member 281 and the second input member 282 and so the length of the input member 28 in the front and rear direction, that is the distance between the front end face of the first input member 281 to the atmospheric valve seat 28*a* of the second input member 282, becomes longer than the length of the input member 2B in the front and rear direction in normal operation under normal temperature by the distance (C–B).

The piston of the master cylinder 51 is pressed by receiving the output Fo3 of the vacuum servo apparatus 10, and brake fluid pressurized by the vacuum servo apparatus 10 is delivered to a pump device of the actuator portion 53.

The pump unit of the actuator portion 53 intakes the brake fluid pressurized by the vacuum servo apparatus 10 and delivers the brake fluid to the wheel cylinder 54 of the right front wheel FR. Accordingly, a brake force is exerted on the right wheel FR.

Therefore, in starting to operate the brake steering control, the brake fluid pressurized by automatic operation of the vacuum servo apparatus 10 is sucked from the master cylinder 51 to the pump unit of the actuator portion 53 by which intake and delivery operation of the pump unit can be made more smooth and accordingly, the brake fluid pressure of the outer side front wheel during turning can be smoothly increased.

As a result of the operation of the brake steering control, by temporarily increasing the brake hydraulic pressure of the outer side front wheel of turning, the oversteered state of the vehicle can be avoided.

In the operation of the brake steering control, the automatic control of the vacuum servo apparatus 10 is carried out by using prestage pressurizing function in the brake steering control.

When release of the brake steering control is detected by a microcomputer of the actuator portion 53, the electronic control device 50 cuts electricity to the solenoid coil 40.

Thereby, the drive force Fa1 of the actuator 39 which has operated on the input member 28 is nullified, the movable core 43 and the first input member 281 are urged by the spring 48 to return to the initial positions, and the second input member 282 and the input rod 27 are moved rearwardly by the urging force of the spring 38 relative to the power piston 22 to return to the initial positions.

Along with the regress of the input member 28, the movable portion 33*c* of the control valve 33 regresses relative to the power piston 22, the negative pressure seal portion 33*b* is separated from the negative pressure valve seat 22*a* and the negative pressure valve portion V2 is opened (the valve mechanism 32 is switched to the output reducing operation state).

When the negative pressure valve seat 22a is separated from the negative pressure seal portion 33b, the vacuum path 35 is communicated with the air path 36 via the clearance between the negative pressure valve seat 22a and the negative pressure seal portions 33b, the two rear chambers 24, 26 communicate with the first front chamber 23, the atmosphere in the two rear chambers 24, 26 is exhausted by the negative pressure source via the first front chamber 23, and pressure in the two rear chambers 24, 26 is reduced.

Therefore, the pressure differences between the two front chambers 23, 25 and between the two rear chambers 24, 26 are reduced, the two movable walls 17, 20 and the power piston 22 are urged rearwardly by the return spring 46 and are returned to the initial positions. That is, the prestage pressurizing operation of the vacuum servo apparatus 10 is finished.

Under normal temperature, for example, when the electronic control device 50 conducts current i2 to the solenoid coil 40 to thereby drive the actuator 39 as the prestage pressurizing operation of the brake steering control, the drive force produced in the actuator 39 becomes Fa2 which is equal to or larger than the drive force Fa1 and is equal to or smaller than the input Fi2.

This is substantially equal to the characteristic in which the jumping output becomes Fo3 with the input Fi1 under normal temperature, that is a state in which an output Fo4 following the operational line c is produced by the input member 28 being applied with the input Fa2 from the driver in a normal braking operation and accordingly the vacuum servo apparatus 10 outputs an output Fo4 to the master cylinder 51. In other words, in a state where there is no input from the river, the output Fo4 is outputted.

Further, as mentioned above, when the actuator 39 is driven by conducting current i1 as the prestage pressurizing operation of the brake steering control under normal temperature and the vacuum servo apparatus 10 outputs an output Fo3, for example, in the case in which the amount of conducting electricity to the solenoid coil 40 is increased from i1 to i2, the drive force of the actuator 39 is increased from Fa1 to Fa2 and accordingly, the output of the vacuum servo apparatus 10 can be increased from Fo3 to Fo4. That is, by controlling the amount of conducting electricity to the solenoid coil 40 and accordingly, the drive force of the actuator 39, the output of the vacuum servo apparatus 10 can be controlled.

In the case in which air temperature and accordingly the temperature of the reaction disk 44 and the rubber member 281c is the low temperature, for example, when the ECU of the actuator portion 53 detects that the vehicle is brought into an oversteered state in turning the vehicle to the left, without braking operation of the driver, there is started operation of the well-known brake steering control (oversteering restraining control) in which brake hydraulic pressure is applied from the pump unit of the actuator portion 53 to the outer side front wheel of turning, that is the right front wheel FR.

While operation of the brake steering control is started at the actuator portion 53, there is carried out the prestage pressurizing operation in which the electronic control device 50 operates the actuator 39 by supplying power from a power supply to the solenoid coil 40. That is, the actuator 39 is operated in the state in which there is no operation of the brake pedal 31, the input rod 27 and the input member 28 by the driver, in other words there is no input from the driver.

When the electronic control device 50 controls the solenoid coil 40 by conducting current i1 to the solenoid coil, an electromagnetic force is generated between the movable core 43 and the fixed core 42 and the movable core 43 is made to progress relative to the power piston 22 against the urging force of the spring 48. With the progress of the movable core 43, the first input member 281 engaged with the first inwardly-directed flange portion 43a of the movable core 43 via the contact portion 281a progresses relative to the power piston 22 and the second input member 282.

By making the movable core 43 progress relative to the power piston 22 and the second input member 282 by the distance C, the front face of the second inwardly-directed flange portion 43b of the movable core 43 engages the rear face of the first outwardly-directed flange portion 282a of the second input member 282 by which, with the progress of the movable core 43, the second input member 282 also progresses. That is, the movable core 43 and the input member 28 integrally progress relative to the power piston 22.

At this time, the clearance of the distance C is produced between the bottom face portion of the recess portion 281d of the first input member 281 and the front end face of the second input member 282, and the clearance between the rear face of the reaction disk 44 and the front portion of the input member 28 (i.e., the front face portion of the first input member 281) becomes the distance (E−C).

When the movable core 43 further progresses by the distance (E−C), the movable core 43 and the input member 28 integrally progress and the front end portion of the input member 28 is brought into contact with the rear face of the reaction disk 44. That is, the clearance between the reaction disk 44 and the input member 28 is nullified.

Under low temperature, the rubber member 281c of the first input member 281 is hardened at least somewhat and is not easily elastically deformed in the front and rear direction. Accordingly, after the reaction disk 44 and the input member 28 have been brought into contact with each other, the amount of progress of the movable core 43 and accordingly the second input member 282 relative to the first input member 281, becomes substantially null.

The clearance between the bottom face portion of the recess portion 281d of the first input member 281 and the front end portion of the second input member 282 at the point in time where the front end face of the first input member 281 and the rear face of the reaction disk 44 have been brought into contact with each other becomes substantially equal to the distance C.

At this time, the drive force produced at the actuator 39 is Fa1, which is equal to the input value Fi1, and the input member 28 is moved by the drive force Fa1 of the actuator 39. In other words, this is equal to the state in which the input member 28 is exerted with the input Fa1 by the driver.

Further, the amount of movement of the second input member 282 from the initial state relative to the power piston 22 in accordance with the progress of the movable core 43 becomes substantially equal to the distance (E−C).

By virtue of the progress of the input member 28 and accordingly the second input member 282 by the distance (E−C), the negative pressure seal portion 33b of the control valve 33 is brought into contact with the negative pressure valve seat 22a. The negative pressure valve V2 is thus closed, communication between the vacuum path 35 and the air path 36 is cut off, communication between the first front chamber 23 and the second rear chamber 26 is cut off, and the valve mechanism 32 is brought into the output maintaining operation state. Further, the atmospheric valve seat 28a of the input member 28 is separated from the atmospheric seal portion 33a of the control valve 33, the atmospheric valve V1 is opened, and the valve mechanism 32 is brought into the output increasing operation state. At this time, the clearance between the atmospheric valve seat 28a and the atmospheric seal portion 33a is substantially equal to the distance (E–C–A).

Further, the fixed core 42 and the movable core 43 are not brought into contact with each other and the clearance of the distance (D–E) is present between the fixed core 42 and the movable core 43.

When the valve mechanism 32 is brought into the output increasing operation state, atmospheric air flows into the two rear chambers 24, 26 via the clearance between the atmospheric valve seat 28a and the atmospheric seal portion 33a and the air path 36, the pressure in the rear chambers 24, 26 is increased, and the progressive forces are produced at the two movable walls 17, 20 and the power piston 22.

The progressive forces of the two movable walls 17, 20 and the power piston 22 are transmitted from the power piston 22 to the output rod 45 via the fixed core 42 of the actuator 39 and the reaction disk 44, the two movable walls 17, 20, the power piston 22, the actuator 39, the input member 28, the input rod 27 and the output rod 45 integrally start progressing relative to the housing 14 and the operation of the master cylinder 51 is started.

When the input rod 27 progresses relative to the housing 14 in accordance with the driving operation of the actuator 39, the engaging shaft 31a of the brake pedal 31 regresses relative to the input rod 27 in the slit 27a of the input rod 27. Further, when the engaging shaft portion 31a regresses in the slit 27a, the engaging shaft portion 31a is not engaged with the closed end portion of the rear side of the slit 27a. Accordingly, the brake pedal 31 is not moved from the initial position shown in FIG. 5 in accordance with the progress of the input rod 27.

When the power piston 22 progresses relative to the housing 14, the reaction disk 44 is compressed to deform by the power piston 22 and the output rod 45, and is rearwardly bulged to advance into the small diameter portion of the stepped hole of the fixed core 42 (i.e., the central hole of the guide member 47), the reaction disk 44 transmits the progressive force of the power piston 22 and the progressive force of the input member 28 to the output rod 45 and exerts the reaction force in correspondence with the output from the output rod 45 to the input member 28 to thereby make the input member 28 regress relative to the power piston 22.

When the first input member 281 regresses against the force between the fixed core 42 and the movable core 43 produced by conducting electricity to the solenoid coil 40, that is the drive force of the actuator 39, by receiving the reaction force from the reaction disk 44, because the second input member 282 is exerted with the rearward urging force by the spring 38 via the input rod 27, the second input member 282 regresses integrally with the regress of the movable core 43 and the first input member 281.

That is, while maintaining engagement between the second inwardly-directed flange portion 43b of the movable core 43 and the first outwardly-directed flange portion 282a of the second input member 282 and while maintaining the clearance of the distance C between the first input member 281 and the second input member 282, the movable core 43 and the input member are integrally made to regress.

When the input member 28 regresses relative to the power piston 22 by being exerted with the reaction force from the reaction disk 44, finally the atmospheric seal portion 33a of the control valve 33 is again brought into contact with the atmospheric valve seat 28a. Communication between the air path 36 and the atmosphere is thus cut off and the flow of atmosphere into the two rear chambers 24, 26 is stopped (the valve mechanism 32 is switched to the output maintaining operation state).

At this time, the rearward bulging amount of the reaction disk 44 is substantially equal to the separation amount between the atmospheric valve seat 28a and the atmospheric seal portion 33a (E–C–A).

Further, at this time, the input member 28 is operated with the drive force Fa1 from the actuator 39 which is equal to the input Fi1 which is substantially equal to the state in which the vacuum servo apparatus 10 carries out "jumping" operation with the input Fi1 in the normal braking operation under low temperature.

Accordingly, as mentioned above, the output at "jumping" is dependent on the bulging amount of the reaction disk 44, with the bulging amount (E–A–C) of the reaction disk 44 in accordance with the operation of the actuator 39 being smaller than the bulging amount (E–A) of the reaction disk 44 in normal operation under low temperature and accordingly, the output in accordance with the operation of the actuator 39 becomes smaller than the "jumping" output in normal operation. That is, an output Fo5 which is disposed on the characteristic line shown by the one-dotted chain line in FIG. 10 and which is smaller than the output Fo1, is outputted to the master cylinder 51. In other words, in a state in which there is no input from the driver, the output Fo5 is outputted.

Further, particularly when the valve mechanism 32 is shifted from the output increasing operation state to the output maintaining operation state, because the clearance of distance C is present between the first input member 281 and the second input member 282, the length of the input member 28 in the front and rear direction is longer than the length of the input member 28 in the front and rear direction in the normal operation under normal temperature and under low temperature by the distance C and is longer than the length of the input member 28 in the front and rear direction by the distance B when the valve mechanism 32 is shifted from the output increasing operation state to the output maintaining operation state in the prestage pressurizing operation under normal temperature.

The piston of the master cylinder 51 is pressed by receiving the output Fo5 of the vacuum servo apparatus 10 and brake fluid pressurized by the vacuum servo apparatus 10 is delivered toward the pump device of the actuator portion 53.

The pump unit of the actuator portion 53 intakes the brake fluid pressurized by the vacuum servo apparatus 10 and delivers the brake fluid to the wheel cylinder 53 of the right side front wheel FR. Therefore, a brake force is exerted on the right side front wheel FR.

Accordingly, in starting to operate the brake steering control, the brake fluid pressurized by automatic operation of the vacuum servo apparatus 10 is sucked from the master cylinder 51 to the pump unit of the actuator portion 53 by which the intaking and delivering operation of the pump unit can be made more smooth and accordingly the brake hydraulic pressure of the outer side front wheel with respect to the turning direction can be smoothly increased.

By making the length of the input member 28 in the front and rear direction under low temperature longer than the length under normal temperature, the bulging amount of the reaction disk 44 under low temperature which is deficient in comparison with the bulging amount of the reaction disk 44 under normal temperature can be supplemented and therefore, the output value of the automatic operation of the vacuums servo apparatus 10 with current i1 under low temperature can be approximated to the output Fo3 under normal temperature. That is, a difference between the input and output characteristics of the vacuum servo apparatus 10 under normal temperature and under low temperature can be reduced and a variation in the input and output characteristic can be reduced.

When the rearward bulging length in accordance with the elastic deformation of the reaction disk 44 under low temperature, which is deficient in comparison with the rearward bulging length in accordance with the elastic deformation of the reaction disk 44 under normal temperature, corresponds to the distance B, the increasing or decreasing amount of the length of the input member 28 in the front and rear direction in accordance with temperature change is the distance B and accordingly, the output value under low temperature of the vacuum servo apparatus 10 can be made equivalent to or further approximated to the output Fo3 under normal temperature.

According to this described embodiment, the input member 28 constitutes a correcting means for supplementing the bulging amount of the reaction disk 44 under low temperature which is deficient in comparison with the bulging amount of the reaction disk 44 under normal temperature and for at least making the atmospheric valve seat 28a and the atmospheric seal portion 33a proximate to each other.

As a result of operating the brake steering control, the oversteered state of the vehicle can be avoided by temporarily increasing the brake hydraulic pressure of the outer side front wheel of turning. In operating the brake steering control, the automatic operation of the vacuum servo apparatus 10 carries out the prestage pressurizing function in the brake steering control.

When a microcomputer of the actuator portion 53 detects a release of the brake steering control, the electronic control device 50 cuts off electricity to the solenoid coil 40. Thereby, the drive force Fa1 of the actuator 39 operated on the input member 28 is nullified, the movable core 43 and the first input member 281 return to the initial positions by being urged by the spring 48, and the second input member 282 and the input rod 27 return to the initial positions by being rearwardly moved by the urging force of the spring 38 relative to the power piston 22.

In accordance with regressing movement of the input member 28, the movable portion 33c of the control valve 33 regresses relative to the power piston 22, the negative pressure seal portion 33b is separated from the negative pressure valve seat 22a, and the negative pressure valve V2 is opened (the valve mechanism 32 is switched to the output reducing operation state).

By separating the negative pressure valve seat 22a from the negative pressure seal portion 33b, the vacuum path 35 is communicated with the air path 36 via the clearance between the negative pressure valve seat 22a and the negative pressure seal portion 33b, the two rear chambers 24, 26 are communicated with the first front chamber 23, and the atmospheric air in the two rear chambers 24, 26 is exhausted by the negative pressure source via the first front chamber 23 and the pressure in the two rear chambers 24, 26 is reduced.

Accordingly, the pressure differences between the two front chambers 23, 25 and the two rear chambers 24, 26 are reduced, and the two movable walls 17, 20 and the power piston 22 are urged rearwardly by the return spring 46 and are returned to their initial positions. That is, the prestage pressurizing operation of the vacuum servo apparatus 10 is finished.

Under low temperature, for example, when the electronic control device 50 conducts current i2 to the solenoid coil 40 to thereby drive the actuator 39 as the prestage pressurizing operation of the brake steering control, the drive force produced at the actuator 39 becomes Fa2 which is equal to or larger than the brake force Fa1 and is equal to or smaller than the input Fi2.

The characteristic of the behavior is equal to the characteristic in which the jumping output becomes Fo5 by the input Fi1 under low temperature, that is a state in which the input member 28 receives the input Fa2 from the driver and an output Fo6 following an operational line d is produced in the normal braking operation having the operational line d and accordingly the vacuum servo apparatus 10 outputs the output Fo6 to the master cylinder 51. In other words, in the state in which there is no input from the driver, the output Fo6 is outputted.

Further, in the case in which as mentioned above, the actuator 39 is driven by conducting current i1 and the vacuum servo apparatus 10 outputs the output Fo5 as the prestage pressurizing operation of the brake steering control under low temperature, for example, when the amount of conducting electricity to the solenoid coil 40 is increased from i1 to i2, the drive force of the actuator 39 is increased from Fa1 to Fa2 and so the output of the vacuum servo apparatus 10 can be increased from Fo5 to Fo6. That is, by controlling the amount of conducting electricity to the solenoid coil 40 and thus the drive force of the actuator 39, the output of the vacuum servo apparatus 10 can be controlled.

For example, in the prestage pressurizing operation, when the drive force of the actuator 39 is larger than the reaction force from the reaction disk 44, the reaction disk 44 cannot make the input member 28 regress and the atmospheric valve V1 of the valve mechanism 32 maintains the opened state. Therefore, atmospheric air continues being introduced to the two rear chambers 24, 26 and so the pressure of the two rear chambers 24, 26 reaches atmospheric pressure and the output of the vacuum servo apparatus 10 becomes Fo7 as shown in FIG. 9.

Therefore, as shown in FIG. 9, the range of the output which the vacuum servo apparatus 10 can provide in the prestage pressurizing operation becomes equal to or larger than the output Fo3 which is equal to or smaller than the jumping output of the vacuum servo apparatus 10 and equal to or smaller than the output Fo7 which is the output when the pressure of the two rear chambers 24, 26 becomes atmospheric pressure with the input i1.

Under normal temperature, for example, when the driver rapidly depresses the brake pedal 31 with an input Fi3 for emergency braking operation, the input rod 27 and the input member 28 are made to progress relative to the power piston 22.

Meanwhile, when it is detected by a depressing speed detecting means of the brake pedal 31 that the depression of the brake pedal 31 by the input Fi3 constitutes a jam or very quick braking operation, for example, current i1 is conducted to the solenoid coil 40 by the electronic control device 50 as the jam braking operation.

The electromagnetic force is thus generated between the movable core 43 and the fixed core 42, the movable core 43 progresses relative to the power piston 22 against the urging force of the spring 48 and with the progress of the movable core 43, the first input member 281 which is engaged with the first inwardly-directed flange portion 43a of the movable core 43 via the contact portion 281a is moved forward relative to the power piston 22 and the second input member 282.

When the movable core 43 progresses by the distance C relative to the power piston 22 and the second input member 282, the front face of the second inwardly directed flange portion 43b of the movable core 43 is engaged with the rear face of the first outwardly-directed flange portion 282a of the second input member 282 by which by the progress of the movable core 43, the second input member 282 also progresses. That is, the movable core 43 and the input member 28 integrally progress relative to the power piston 22.

That is, the input member 28 is operated with the input Fi3 from the driver and the drive force Fa1 from the actuator 39. In other words, this state is equal to the state in which an input Fi4 (=Fi3+Fa1) is applied to the input member 28 from the driver.

Accordingly, by the progress of the input member 28 relative to the power piston 22, the valve mechanism 32 is switched from the output reducing operation state to the output increasing operation state via the output maintaining operation state and atmospheric air flows into the two rear chambers 24, 26 by which the two movable walls 17, 20, the power piston 22, the input member 28, the actuator 39, the input rod 27 and the output rod 45 start progressing relative to the housing 14.

Finally, the force (Fi3+Fa1) exerted on the input member 28 and the reaction force from the reaction disk 44 are balanced, the valve mechanism 32 is brought into the output maintaining operation state, and the vacuum servo apparatus 10 produces an output. At this time, as shown in FIG. 9, the output value of the vacuum servo apparatus 10 is equal to an output value Fo8' following the operational line a which is outputted when the input Fi4 is applied to the input member 28 under normal temperature. In other words, there is outputted the output Fo8' which is equal to or larger than the output Fo8 by the input Fi3 in correspondence with the output Fo8 in normal braking operation.

Under normal temperature, for example, when the electronic control device 50 conducts current i2 to the solenoid coil 40 to thereby drive the actuator 39 in a rapid braking operation by the input applied to the brake pedal 31 of Fi3, the drive force produced at the actuator 39 becomes Fa2 and the force operated on the input member 28 becomes (Fi3+Fa2). This state is equal to a state in which an input value Fi5 (=Fi3+Fa2) is applied to the input member 28 from the driver.

At this time, as shown by FIG. 9, the output value of the vacuum servo apparatus 10 is equal to an output value Fo9 following the operational line a which is outputted when the input member 28 is applied with the input Fi5. In other words, there is outputted the output Fo9 which is equal to or larger than the output Fo8 by the input Fi3 in correspondence with the output Fo8 in the normal braking operation.

Further, in the case in which the actuator 39 is driven by conducting current i1 and the vacuum servo apparatus 10 outputs the output Fo8' as a rapid braking operation, as mentioned above, with the input Fi1, for example, when the amount of conducting electricity to the solenoid coil 40 is increased from i1 to i2, the drive force of the actuator 39 is increased from Fa1 to Fa2 and accordingly, the output of the vacuum servo apparatus 10 can be increased from Fo8' to Fo9. That is, by controlling the amount of conducting electricity to the solenoid coil 40 and accordingly the drive force of the actuator 39, the output of the vacuum servo apparatus 10 can be controlled.

In a rapid braking operation, when the sum of the drive force of the actuator 49 and the input from the driver is larger than the reaction force from the reaction disk 44, the reaction disk 44 cannot make the input member 28 regress and the atmospheric valve V1 of the valve mechanism 32 maintains an opened state. Accordingly, by continuously introducing atmospheric air into the two rear chambers 24, 26, then pressure in the two rear chambers 24, 26 reaches atmospheric pressure and the output of the vacuum servo apparatus 10 provides an output on the operational line e shown in FIG. 9.

In a rapid braking operation at the input Fi3 under normal temperature, when the drive force of the actuator 39 is sufficiently larger than the reaction force from the reaction disk 44, the vacuum servo apparatus 10 produces an output Fo10.

Accordingly, the range of the output which the vacuum servo apparatus 10 can provide rapid braking operation under normal temperature is changed from the output on the operational line a to a range of the output on the operational line e where the pressure of the two rear chambers 24 26 becomes atmospheric pressure in the range of the input of Fi1 through Fi2.

As has been explained, according to the vacuum servo apparatus 10 of this described embodiment, even when the reaction disk 44 is hardened somewhat in accordance with the lowering of the air temperature and accordingly the lowering of the temperature of the reaction disk 44 itself so that the amount of elastic deformation is reduced in comparison with the amount of elastic deformation under normal temperature. Considering an increase or a decrease in the elastic deformation amount in accordance with a change in temperature of the reaction disk 44, the length in the front and rear direction from the front end portion of the input member 28 to the atmospheric valve seat 28a under low temperature can be made longer than that under normal temperature and so an amount of elastic deformation of the reaction disk 44 under low temperature which is deficient in comparison with that under normal temperature can be supplemented. Accordingly, in a situation in which the actuator 39 is operated and the vacuum servo apparatus 10 produces an output in a state where there is no input from the driver, for example in the prestage pressurizing operation of the brake steering control, an output under normal temperature and an output under low temperature can be approximated to each other and an always stable output can be supplied. In other words, in the prestage pressurizing operation of the brake steering control, variation of the input and output characteristics under normal temperature relative to the input and output characteristics under low temperature can be restrained.

Further, an increase or a decrease in the rearward bulging length in accordance with the elastic deformation of the reaction disk 44 associated with a change in temperature of the reaction disk 44 and an increase or a decrease in the length in the front and rear direction in accordance with the elastic deformation of the rubber member 281c associated with a change in temperature of the rubber member 281c of the input member 28, are made to be substantially equal to each other. Thus, the rearward bulging length in accordance with the elastic deformation of the reaction disk 44 under low temperature which is deficient in comparison with that under normal temperature and the amount of increasing the length of the input member 28 in the front and rear direction comparable to that under normal temperature, can further be approximated to each other. Therefore, particularly in a situation in which the actuator 39 is operated and the vacuum servo apparatus 10 produces an output in a state in which there is no input from the driver, for example, in the prestage pressurizing operation of the brake steering control, the output under normal temperature and the output under low temperature can be further approximated to each other and an always stable output can be supplied.

Further, under normal temperature, the progress of the movable core 43 relative to the first input member 281 is restricted by bringing the front face of the movable core 43 into contact with the peripheral edge portion of the opening of the cylindrical portion 281b and so the elastic deformation amount of the rubber member 281c can be set to the predetermined amount B. Accordingly, the amount of movement of the movable core 43 relative to the first input member 281 can firmly be determined as the predetermined amount B. By setting the predetermined amount B in accordance with an increase or a decrease of the elastic deformation amount associated with a change in temperature of the reaction disk, variation between the input and output characteristics under normal temperature and under low temperature of the vacuum servo apparatus 10 can further be restrained. Also, the predetermined amount B can easily be set.

Also, the vacuum servo apparatus 10 of this embodiment is not as susceptible to the same disadvantages and drawbacks as those associated with the apparatus mentioned above and disclosed in U.S. Pat. No. 5,483,866. In the vacuum servo apparatus 10 of the present invention, the construction is such that in driving the actuator 39, the atmospheric valve of the valve mechanism 32 can be closed by making the input member 28 regress through receiving the reaction force from the reaction disk 44 and so a strong brake force is not produced even when the actuator or the like is failed. That is, in the automatically operable vacuum servo apparatus, there is constructed a constitution which is applicable as an initial pressure increasing function in the brake hydraulic pressure control device having the brake steering control and in which in driving the actuator 39, the atmospheric valve of the valve mechanism 32 can be closed by making the input member 28 regress by receiving the reaction force of the reaction disk 44. Thus there is provided the vacuum servo apparatus 10 in which strong brake force is not produced even when the actuator has failed.

Further, the actuator 39 makes the movable core 43 progress against the urging force of the spring 38, with the load of the spring 38 being made adjustable by the adjustment nut 49, and so the actuator 39 can be further driven accurately.

Also, by adjusting the amount of current conducted to the solenoid coil 40 of the actuator 39, the force generated between the movable core 43 and the fixed core 42, that is the drive force of the actuator 39, is made adjustable by the solenoid coil 40. By making the drive force of the actuator 39 adjustable, the output achieved by the output rod 45 in accordance with the operation of the actuator 39 is made adjustable and there can be achieved further proper output in accordance with the situation.

Additionally, in the prestage pressurizing operation of the brake steering control, with respect to an outputtable range of the vacuum servo apparatus 10, Fo3 which is equal to or lower than the jumping output Fo1 to Fo7 where the pressure in the rear chambers 24, 26 becomes atmospheric pressure can be outputted and the output control can be carried out in this range.

Further, in operating the actuator 39 in the state in which the brake pedal 31 and accordingly, the input member 28 is not operated, in other words in the prestage pressurizing operation of the brake steering control, by the progressing movement of the power piston 22 relative to the input member 28 and the regressing movement of the input member 28 relative to the power piston 22 by the reaction disk 44, the valve mechanism 32 is brought into the output maintaining operation state, by which the state in which the pressure of the rear chambers 24, 26 becomes atmospheric pressure, that is generation of output following the operational line e in FIG. 9, can be restricted.

By adjusting the amount of current supplied to the solenoid coil 40, the input and output characteristics achieved in accordance with operation of the actuator 39 of the vacuum servo apparatus 10 can be matched to desired characteristics. Accordingly, the vacuum servo apparatus 10 is able to reduce the variation of the input and output characteristics.

Although the described embodiment of the vacuum servo apparatus 10 possesses a tandem type construction, a similar operation and effect may be achieved with a vacuum servo apparatus having a single type construction.

Further, although according to the described embodiment, the vacuum servo apparatus 10 is applied to the brake device for prestage pressurizing of the brake steering control and for assisting rapid braking operation, the invention is not limited in this regard as a similar operation and effect may be obtained when the vacuum servo apparatus is applied to various brake devices which do not need generation of a maximum output in the vacuum servo apparatus. An example of a brake device which does not need generation of maximum output is an automatic brake device for controlling an intervehicular distance for maintaining an intervehicular distance with respect to a forward located vehicle by carrying out braking operations in a vehicle without braking operation input of a driver through operation of the actuator 39 when, for example, the intervehicular distance with respect to the forward vehicle becomes shorter than a predetermined distance during running of the vehicle. According to the automatic brake device for controlling the intervehicular distance, there is requested a vacuum servo apparatus in which the output can smoothly be changed from an output corresponding to a reduced speed (0.05 through 0.1 G) to an output in correspondence with a medium reduced speed (0.3 through 0.4 G), particularly in a vacuum servo apparatus in which the jumping output becomes an output larger than an output in correspondence with the reduced speed, by adopting the construction of the vacuum servo apparatus 10 according to the disclosed embodiment. The output can be controlled smoothly from the output corresponding to the reduced speed to the output corresponding to the medium reduced speed.

In the above-described embodiment, it is described that the movable core 43 is moved forwardly, the first input member 281 is brought into contact with the reaction disk 44 and the rubber member 281c is deformed by being compressed by the movable core 43 before rearward bulging of the reaction disk 44. However, the invention is not limited particularly to this operational mode, but in sum the length of the input member 28 in the front and rear direction may be changed by elastically deforming the rubber member 281c.

Also, the first input member 281 of the input member 28 is described as being divided into the front portion 281e incorporated in the center hole 22c and the rear portion 281f having the contact portion 284 and the recess portion 281d for being assembled to the power piston 22, the invention is not particularly limited in this regard as similar operation and effect may be achieved even with a vacuum servo apparatus according in which the front portion 281e and the rear portion 281f are integrally constructed.

Although the reaction disk 44 and the rubber member 284*b* are disclosed as being made of rubber, but other materials having elasticity and characteristics which cause the amount of elastic deformation to change based on an increase or decrease in the temperature or their own temperature can also be employed.

Further, although according to the described embodiment, there is provided the correcting means in which the input member 28 supplements the bulging amount of the reaction disk 44 under low temperature which is deficient in comparison with the bulging amount of the reaction disk 44 under normal temperature to thereby make at least the atmospheric valve seat 28*a* and the atmospheric seal portion 33*a* proximate to each other, the invention is not particularly limited in this regard. In sum, the bulging amount of the reaction disk 44 under low temperature which is deficient in comparison with the bulging amount of the reaction disk 44 under normal temperature may be supplemented.

As explained above, a generally always stable output can be supplied without being influenced by the increase or the decrease in the elastic deformation amount associated with the temperature change of the reaction force member. There is thus provided a vacuum servo apparatus capable of reducing the variation of the input and output characteristics of the apparatus.

The apparatus includes a preferred construction of the reaction force member and the contact portion which, in conjunction with the other features supplies a generally always stable output. Also, the movement amount of the second input member relative to the first input member is made firm.

According to the present invention, the always stable output can be supplied without being influenced by an increase or decrease of the amount of elastic deformation associated with temperature changes of the reaction force member. The vacuum servo apparatus is applicable not only to the initial pressure increasing function in the brake steering control system but also in operating the actuator, the rear chamber can be restricted from reaching the atmospheric pressure, and there is produced output suitable for the prestage pressurizing function which is not larger than the output of other known vacuum servo apparatus achieving a maximum assisting force. There is thus little concern of producing a strong brake force in the brake device.

The present invention makes it possible to provide a vacuum servo apparatus capable of reducing the variation of the input and output characteristics, to provide a vacuum servo apparatus capable of restricting the output in accordance with operating the actuator at a maximum output or smaller, and to provide a vacuum servo apparatus applicable as the prestage pressurizing function in the brake hydraulic pressure control device having the brake steering control to thereby further make effective the control of the brake steering control.

Also, in the present invention, the output provided from the output member in accordance with operating the actuator can be adjusted and further suitable output in accordance with situation can be achieved.

In the present invention, in addition to the advantage that the generally always stable output can be supplied without being influenced by the increase or the decrease in the amount of elastic deformation associated with temperature changes in the reaction force member, the vacuum servo apparatus is applicable to the initial pressure increasing function in the brake steering control system and the rear chamber can also be restricted from reaching the atmospheric pressure in operating the actuator. Further an output suitable for the prestage pressurizing function is produced which is not larger than the output of the known vacuum servo apparatus achieving a maximum assisting force and so there is no concern of producing a strong brake force in the brake device.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A vacuum servo apparatus comprising:

a housing in which is formed at least one pressure space;

a movable wall installed in the housing for progressive and regressive movement relative to the housing and dividing the pressure space into a front chamber adapted to be communicated with a negative pressure source and a rear chamber adapted to be selectively communicated with the front chamber and atmosphere;

a power piston coupled to the movable wall;

an input member arranged at an inner portion of the power piston for progressive and regressive movement relative to the power piston and movable through operation of an operating member;

a valve mechanism having a negative pressure valve for communicating the rear chamber to the front chamber according to movement of the input member and an atmospheric valve for communicating the rear chamber with the atmosphere according to movement of the input member;

an output member for outputting a progressive force of the power piston to outside by progressing as a result of progress of the power piston in accordance with movement of the movable wall;

a reaction force member for transmitting the progressive force of the power piston and an input applied to the input member to the output member and for exerting a reaction force having a magnitude corresponding to an output from the output member to cause the input member to regress through elastic deformation of the reaction force member;

an amount of elastic deformation of the reaction force member being changed in accordance with at least a change in temperature of the reaction force member, with the input member regressing by receiving the reaction force from the reaction force member to thereby close the atmospheric valve; and the input member having a length in a front and rear direction that is adapted to be changed in accordance with at least a change in temperature in the input member, to compensate for the change in the amount of elastic deformation associated with at least the change in temperature of the reaction force member.

2. The vacuum servo apparatus according to claim 1, wherein the atmospheric valve includes an atmospheric valve seat arranged at the input member and integrally movable with the input member relative to the power piston and an atmospheric seal portion engageable with and disengageable from the atmospheric valve seat for cutting off communication between the rear chamber and the atmosphere by engaging the atmospheric valve seat and for communicating the rear chamber to the atmosphere by being disengaged from the atmospheric valve seat, the input member including a contact portion adapted to be brought into contact with the reaction force member at a front portion thereof and the length of the input member in the front and rear direction being a distance between the contact portion and the atmospheric valve seat.

3. The vacuum servo apparatus according to claim 2, wherein the input member includes a first input member adapted to be brought into contact with the reaction force member and a second input member having the atmospheric valve seat and arranged on a rear side of the first input member for progressive and regressive movement relative to the first input member, at least one of the first input member and the second input member including an engaging portion engaging with the other of the first and second input member, and an elastic deformation amount of the engaging portion being increased or decreased in accordance with a change in temperature of the engaging portion.

4. The vacuum servo apparatus according to claim 3, wherein an increase or a decrease in a length of rearward bulging of the reaction force member in accordance with the elastic deformation of the reaction force member associated with the change in the temperature of the reaction force member and an increase or a decrease in a length of the engaging portion in the front and rear direction in accordance with elastic deformation of the engaging portion associated with a change in the temperature of the engaging portion being substantially equal to each other.

5. The vacuum servo apparatus according to claim 3, including a restricting member for restricting the amount of elastic deformation of the engaging portion to a predetermined amount.

6. A vacuum servo apparatus comprising:
a housing in which is formed at least one pressure space;
a movable wall installed in the housing for dividing the pressure space into a front chamber adapted to be communicated with a negative pressure source and a rear chamber adapted to be selectively communicated with the front chamber and the atmosphere;
a power piston coupled to the movable wall;
an input member arranged at an inner portion of the power piston for progressive and regressive movement relative to the power piston and movable by operating an operating member;
a valve mechanism having a negative pressure valve for communicating the rear chamber to the front chamber according to movement of the input member and an atmospheric valve for communicating the rear chamber with atmosphere in accordance with the movement of the input member;
an output member for outputting a progressive force of the power piston to outside by being moved in response to progressive movement of the power piston in accordance with movement of the movable wall;
a reaction force member for transmitting the progressive force of the power piston and an input applied to the input member to the output member and adapted to exert a reaction force having a magnitude corresponding to an output from the output member to cause regressive movement of the input member through elastic deformation and rearward bulging of the reaction force member; and
an actuator for causing the output member to progress independently from the progressive force produced in the power piston by operating the valve mechanism through movement of the input member in accordance with operation of the operating member;
an amount of elastic deformation of the reaction force member being changed in accordance with a change in at least temperature of the reaction force member; and
the atmospheric valve being closed by causing the input member to regress by receiving the reaction force from the reaction force member in driving the actuator, and a length of the input member in a front and rear direction being changed in accordance with at least a change in temperature in the input member, to compensate for the change in the amount of elastic deformation of the reaction force member in accordance with at least the change in the temperature of the reaction force.

7. The vacuum servo apparatus according to claim 6, wherein the actuator causes the output member to progress by opening the atmospheric valve.

8. The vacuum servo apparatus according to claim 7, wherein the atmospheric valve includes an atmospheric valve seat integrally arranged at the input member and an atmospheric seal portion engageable with and disengageable from the atmospheric valve seat for cutting off communication between the rear chamber and the atmosphere by being brought into engagement with the atmospheric valve seat and communicating the rear chamber with the atmosphere by being disengaged from the atmospheric valve seat, the negative pressure valve including a negative pressure valve seat arranged at the power piston and a negative pressure seal portion engageable with and disengageable from the negative pressure valve seat for cutting off communication between the front chamber and the rear chamber by being brought engagement with the negative pressure valve seat and communicating the rear chamber with the front chamber by being disengaged from the negative pressure valve seat, the actuator opening the atmospheric valve by moving the input member.

9. The vacuum servo apparatus according to claim 8, wherein the input member includes a first input member adapted to be brought into contact with the reaction force member and a second input member having the atmospheric valve seat, the second input member being arranged on a rear side of the first input member and adapted for progressive and regressive movement relative to the first input member, the actuator including a movable member arranged for progressive and regressive movement to move the input member by being engaged with the input member, the movable member including a first engaging portion for engaging with the first input member and a second engaging portion for engaging with the second input member, a first engaged portion of the first input member engaged with the first engaging portion of the movable member being provided with an elasticity and engaged with the first engaging portion at an initial state, a second engaged portion of the second input member engaged with the second engaging portion of the movable member being provided with a predetermined clearance between the second engaged portion and the second engaging portion in an initial state, and an elastic deformation amount of the first engaged portion being increased or decreased in accordance with a change in temperature of the first engaged portion.

10. The vacuum servo apparatus according to claim 9, wherein an increase or a decrease in a length of the rearward bulging of the reaction force member in accordance with the elastic deformation of the reaction force member associated with the change in temperature of the reaction force member and an increase or a decrease in length of the first engaged portion in the front and rear direction in accordance with the elastic deformation of the first engaged portion associated with the change in temperature of the first engaged portion are substantially equal to each other.

11. The vacuum servo apparatus according to claim 9, further including a restricting member for restricting the amount of elastic deformation of the first engaged portion to a predetermined amount.

12. The vacuum servo apparatus according to claim 6, further comprising:

an urging member for rearwardly urging the input member; and an adjusting mechanism for adjusting a load of the urging member.

13. The vacuum servo apparatus according to claim 9, wherein the actuator includes a solenoid connected to a power source to move the movable member by receiving a supply of power.

14. The vacuum servo apparatus according to claim 6, wherein the output from the output member is adjusted by adjusting a drive force of the actuator.

15. The vacuum servo apparatus according to claim 6, wherein the atmospheric valve includes an atmospheric valve seat arranged at the input member integrally movably with the input member relative to the power piston and an atmospheric seal portion engageable with and disengageable from the atmospheric valve seat for cutting off communication between the rear chamber and the atmosphere by being engaged with the atmospheric valve seat and communicating the rear chamber to the atmosphere by being disengaged from the atmospheric valve seat, and the input member including a contact portion adapted to be brought into contact with the reaction force member at a front portion thereof and the length of the input member in the front and rear direction is a distance between the contact portion and the atmospheric valve seat.

16. A vacuum servo apparatus comprising:

a housing in which is formed at least one pressure space;

a movable wall installed in the housing for progressive and regressive movement relative to the housing and dividing the pressure space into a front chamber adapted to communicate with a negative pressure source and a rear chamber adapted to selectively communicate with the front chamber and atmosphere;

a power piston coupled to the movable wall;

an input member arranged at an inner portion of the power piston for progressive and regressive movement relative to the power piston and movable by operation of an operating member;

a negative pressure valve for communicating the rear chamber with the front chamber in accordance with movement of the input member;

an atmospheric valve including an atmospheric valve seat arranged at the input member and integrally movably with the input member relative to the power piston and an atmospheric seal portion engageable with and disengageable from the atmospheric valve seat for cutting off communication between the rear chamber and the atmosphere by bringing the atmospheric seal portion into engagement with the atmospheric valve seat in accordance with the movement of the input member and communicating the rear chamber with the atmosphere by disengaging the atmospheric seal portion from the atmospheric valve seat;

an output member for outputting a progressive force of the power piston to outside of the apparatus by being made to progress by progress of the power piston in accordance with movement of the movable wall; and a reaction force member for transmitting the progressive force of the power piston and an input applied to the input member to the output member and adapted to exert a reaction force having a magnitude in correspondence with an output from the output member to cause the input member regress by being elastically deformed to bulge rearwardly by receiving at least the progressive force of the power piston;

an amount of rearward bulging of the reaction force member when a temperature of the reaction force member is a first temperature and the output outputted from the output member is provided with a first output value being less than an amount of rearward bulging of the reaction force member when the temperature of the reaction force member is a second temperature lower than the first temperature and the output outputted from the output member is provided with the first output value;

correcting means for making at least the atmospheric valve seat and the atmospheric seal portion proximate to each other by supplementing at least a portion of a difference between the amount of rearward bulging the reaction force member when the temperature of the reaction force member is the first temperature and the output outputted from the output member is provided with the first output value and the amount of rearwardly bulging the reaction force member when the temperature of the reaction force member is the second temperature lower than the first temperature and the output outputted from the output member is provided with the first output value.

17. A vacuum servo apparatus comprising:

a housing in which is formed at least one pressure space;

a movable wall installed in the housing for progressive and regressive movement relative to the housing and dividing the pressure space into a front chamber adapted to communicate with a negative pressure source and a rear chamber adapted to selectively communicate with the front chamber and the atmosphere;

a power piston coupled to the movable wall;

an input member arranged at an inner portion of the power piston for progressive and regressive movement relative to the power piston and movable by operating an operating member;

a negative pressure valve for communicating the rear chamber with the front chamber in accordance with movement of the input member;

an atmospheric valve including an atmospheric valve seat arranged at the input member and integrally movably with the input member relative to the power piston and an atmospheric seal portion engageable with and disengageable from the atmospheric valve seat for cutting off communication between the rear chamber and the atmosphere by bringing the atmospheric seal portion into engagement with the atmospheric valve seat in accordance with movement of the input member and communicating the rear chamber with the atmosphere by disengaging the atmospheric seal portion from the atmospheric valve seat;

an output member for outputting a progressive force of the power piston to outside of the apparatus by being caused to progress by progress of the power piston in accordance with movement of the movable wall;

a reaction force member for transmitting the progressive force of the power piston and an input applied to the input member to the output member and adapted to exert a reaction force having a magnitude in correspondence with an output from the output member to make the input member regress by being elastically deformed to bulge rearwardly by receiving at least the progressive force of the power piston; and an actuator adapted to progressively move the output member independently from the progressive force produced at the power piston by operating the valve mechanism through movement of the input member in accordance with operating the operating member;

an amount of rearward bulging of the reaction force member when a temperature of the reaction force member is a first temperature and the output outputted from the output member is provided with a first output value being less than an amount of rearward bulging of the reaction force member when the temperature of the reaction force member is a second temperature lower than the first temperature and the output outputted from the output member is provided with the first output value;

wherein the atmospheric valve is adapted to be closed by making the input member regress upon receiving the reaction force from the reaction force member in driving the actuator; and correcting means for making at least the atmospheric valve seat and the atmospheric seal portion proximate to each other by supplementing at least a portion of a difference between the amount of rearward bulging the reaction force member when the temperature of the reaction force member is the first temperature and the output outputted from the output member is provided with the first output value and the amount of rearwardly bulging the reaction force member when the temperature of the reaction force member is the second temperature lower than the first temperature and the output outputted from the output member is provided with the first output value.

\* \* \* \* \*